(12) United States Patent
Naruse et al.

(10) Patent No.: US 7,699,096 B2
(45) Date of Patent: Apr. 20, 2010

(54) AIR CONDITIONER FOR VEHICLE USE

(75) Inventors: Shinji Naruse, Kariya (JP); Yoshihiko Okumura, Kariya (JP)

(73) Assignee: Denso Corporation, Kariya (JP)

( * ) Notice: Subject to any disclaimer, the term of this patent is extended or adjusted under 35 U.S.C. 154(b) by 1255 days.

(21) Appl. No.: 11/224,714

(22) Filed: Sep. 12, 2005

(65) Prior Publication Data

US 2006/0053815 A1 Mar. 16, 2006

(30) Foreign Application Priority Data

Sep. 15, 2004 (JP) ............... 2004-268105

(51) Int. Cl.
*F25B 29/00* (2006.01)
*B60H 1/00* (2006.01)
*B60H 3/00* (2006.01)

(52) U.S. Cl. ............... 165/202; 165/203; 165/204; 165/42; 165/43; 165/103; 236/49.3; 236/91 C; 454/75; 454/121; 454/126; 454/156; 454/160; 454/161; 62/244; 251/901

(58) Field of Classification Search ............... 165/202, 165/203, 204, 42, 43, 103; 236/49.3, 91 C; 454/75, 156, 126, 121, 160, 161; 251/901; 62/244

See application file for complete search history.

(56) References Cited

U.S. PATENT DOCUMENTS

| 4,759,269 | A | 7/1988 | Brown et al. |
| 6,293,339 | B1 * | 9/2001 | Uemura et al. ............... 165/203 |
| 6,955,338 | B2 * | 10/2005 | Okumura et al. ......... 251/249.5 |
| 7,234,516 | B2 * | 6/2007 | Umebayashi et al. ....... 165/202 |
| 2004/0194947 | A1 * | 10/2004 | Ito et al. ..................... 165/203 |
| 2004/0206100 | A1 * | 10/2004 | Tokunaga et al. ........... 165/203 |
| 2005/0215190 | A1 * | 9/2005 | Okumura et al. ............ 454/121 |
| 2006/0053815 | A1 * | 3/2006 | Naruse et al. ............... 165/202 |
| 2007/0111651 | A1 * | 5/2007 | Sekito et al. ................. 454/121 |

FOREIGN PATENT DOCUMENTS

JP 2682627 8/1997

* cited by examiner

*Primary Examiner*—John K Ford
(74) *Attorney, Agent, or Firm*—Harness, Dickey & Pierce, PLC

(57) ABSTRACT

The first cold air flow door 26 and the first hot air flow door 24 for adjusting the blowout air temperature are arranged in the first air passage, and the second cold air flow door 27 and the second hot air flow door 25 for adjusting the blowout air temperature are arranged in the second air passage. When a larger target air flow volume between the target air flow volume on the first air passage side and the target air flow volume on the second air passage side is selected so as to determine an air flow volume of the blower, in an air passage to which the smaller target air flow volume is applied, while the ratio of the cold air flow volume to the hot air flow volume is being maintained constant, the passage opening area is throttled by the cold air flow door and the hot air flow door.

7 Claims, 12 Drawing Sheets

STATE OF LARGE VOLUME OF AIR FLOW

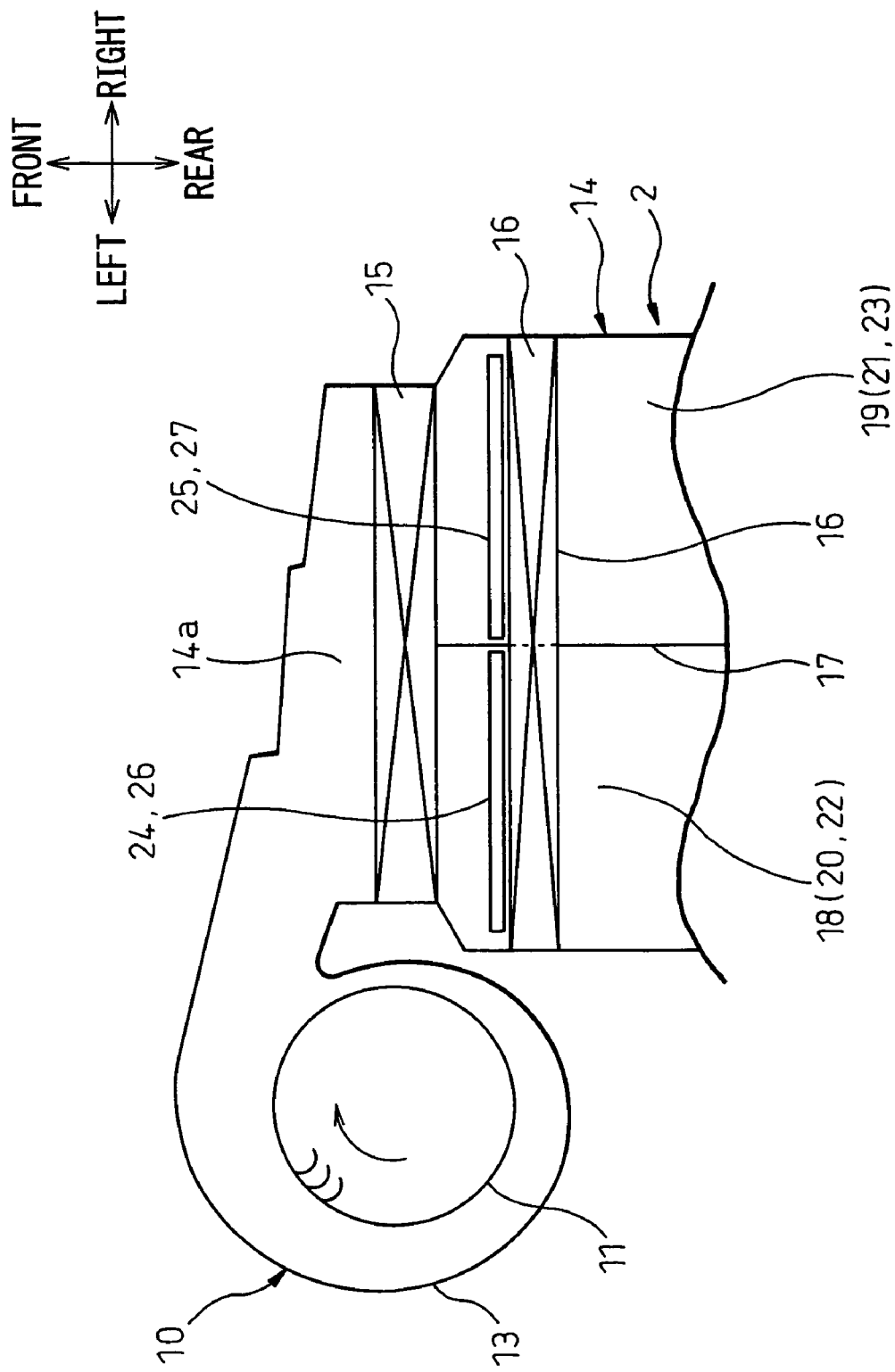

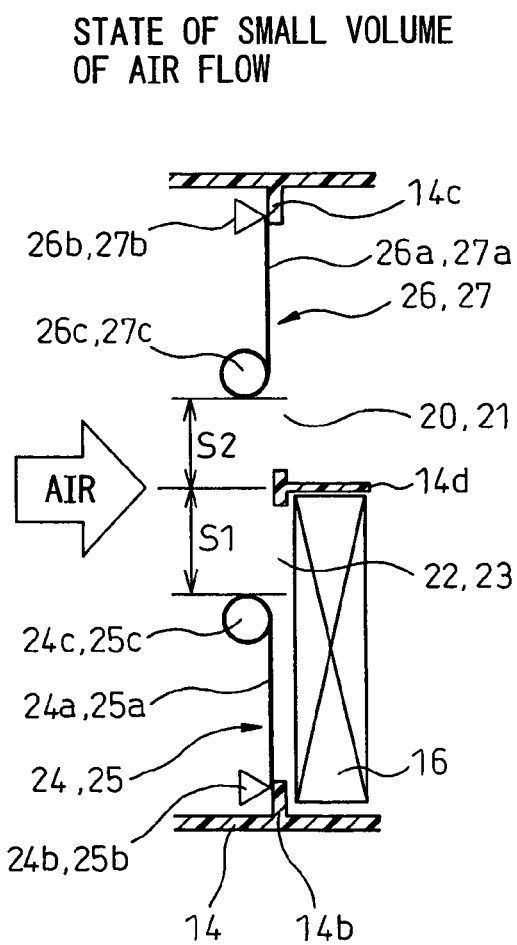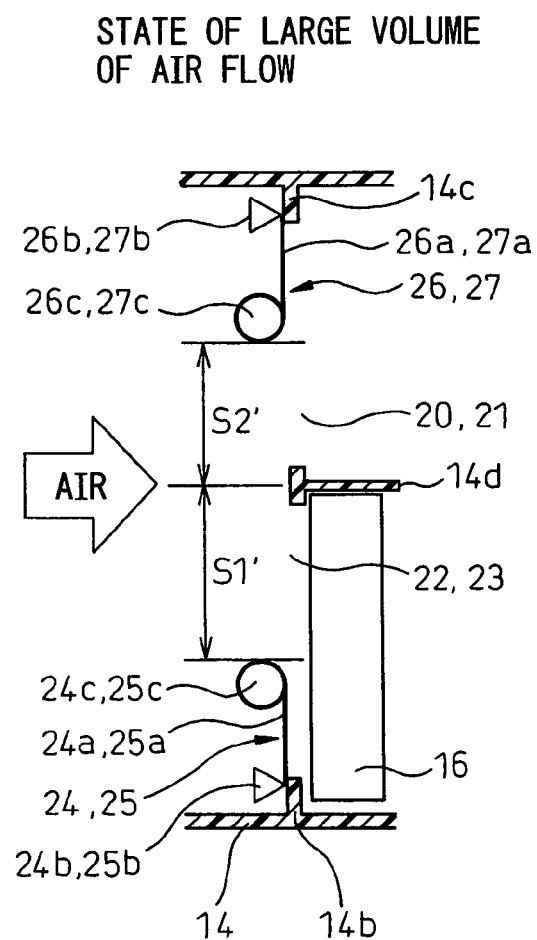

AIR CONDITIONER FOR VEHICLE USE

BACKGROUND OF THE INVENTION

1. Field of the Invention

The present invention relates to air volume control conducted in an air conditioner for vehicle use. More particularly, the present invention relates to air volume control preferably applied to an air conditioner for vehicle use in which a volume of air blown out to a right region in a passenger compartment and a volume of air blown out to a left region therein are independently controlled.

2. Description of the Related Art

Conventionally, the official gazette of Japanese Patent No. 2682627 discloses an air conditioner for vehicle use in which a volume of air blown out to a right region in a passenger compartment and a volume of air blown out to a left region therein are controlled.

This prior art is composed as follows. The inside of a duct connecting a blowout portion of a single blower unit with an entrance portion of a heat exchanger for cooling (evaporator) is partitioned into a right passage and a left passage of a vehicle. An air flow distributing door composed of one plate door is pivotally arranged in this passage partitioning portion. By this one air flow distributing door, a ratio of the opening of the right passage in the duct to the opening of the left passage is changed over, so that a volume of air blown out to the right region in the passenger compartment and a volume of air blown out to the left region therein can be changed.

However, according to the above prior art, the following problems may be encountered. When the opening area of one of the right and left passages in the duct is reduced, the opening area of the other passage is necessarily increased. Therefore, it is difficult to change a volume of air only in one passage. Further, as an air flow distributing door, which is exclusively used for distributing an air blast to the right and left, is arranged in the above structure, it becomes necessary to provide a space in which the air flow distributing door is exclusively arranged. Accordingly, the size of the air conditioner is increased, which makes it difficult to mount the air conditioner on a vehicle.

In this connection, the above prior art describes a case in which a volume of air blown out to the right region of the passenger compartment and a volume of air blown out to the left region therein are controlled. However, the same problems may be encountered in a case in which a volume of air blown out to the front seat side region of the passenger compartment and a volume of air blown out to the rear seat side region therein are controlled.

SUMMARY OF THE INVENTION

From the above viewpoints, it is an object of the present invention to provide an independent air-volume controlling mechanism characterized in that: when an air volume of one of the plurality of air passages is changed, a change in the air volume of the other of the plurality of air passages can be made small in an air conditioner for vehicle use having a plurality of air passages from which conditioned air is independently blown out into a plurality of regions in a passenger compartment.

It is another object of the present invention to provide an air conditioner for vehicle use characterized in that: when a door means for adjusting a temperature of air blown out into a passenger compartment is utilized as it is, the volumes of air flowing in a plurality of air passages can be independently controlled.

In order to accomplish the above objects, the present invention is composed as follows. In an air conditioner for vehicle use in which a conditioned air flow is sent from a single blower (10) to a first air passage (18), from which conditioned air is blown out into a first region in a passenger compartment, and a second air passage (19), from which conditioned air is blown out into a second region in the passenger compartment, a ratio of the volume of a cold air flow flowing in a first cold air flow passage (20) provided in the first air passage (18) to the volume of a hot air flow flowing in a first hot air flow passage (22) is adjusted by a first cold air flow door (26) and a first hot air flow door (24) so as to adjust a temperature of air blown out from the first air passage (18) to the first region in a passenger compartment. A ratio of the volume of a cold air flow flowing in a second cold air flow passage (21) provided in the second air passage (19) to the volume of a hot air flow flowing in the second hot air flow passage (23) is adjusted by the second cold air flow door (27) and the second hot air flow door (25) so as to adjust a temperature of the air flow blown out from the second air passage (19) to the second region in the passenger compartment. The first air flow volume control value (VBL) corresponding to a target blowout air volume on the first air passage (18) side and the second air flow volume control value (VBR) corresponding to a target blowout air volume on the second air passage (19) side are independently calculated. An air flow volume of the blower (10) is determined according to the first air flow volume control value (VBL) and the second air flow volume control value (VBR). In an air passage to which a lower air flow volume control value with respect to a higher air flow volume control value between the first air flow volume control value (VBL) and the second air flow volume control value (VBR) is applied, while a ratio of the cold air flow volume to the hot air flow volume determined by the cold air flow door and the hot air flow door is being maintained constant, an opening area of the passage is throttled by the cold air flow door and the hot air flow door.

Due to the foregoing, when conditioned air is sent to the first and the second air passage (18, 19) by the single blower (10), an air flow volume of the blower (10) is determined by the first air flow volume control value (VBL) on the first air passage (18) side and the second air flow volume control value (VBR) on the second air passage (19) side. In this case, in the air passage to which the higher air flow volume control value is applied, an air flow volume of the blower (10) may be determined so that the target blowout air flow volume can be ensured.

In this connection, when it is determined so that an air flow volume of the single blower (10) can be suited to the air passage to which the higher air flow volume control value is applied, an excessively large air flow volume is sent to the air passage to which the lower air flow control value is applied. Therefore, in the present invention, in the air passage to which the lower air flow volume control value is applied, while a ratio of the cold air flow volume to the hot air flow volume is being maintained constant, a passage opening area is throttled by the cold air flow door and the hot air flow door. Therefore, it is possible to avoid the phenomenon, in which an excessively large volume of air is supplied, without changing the blowout air temperature.

Therefore, in the air passage to which the lower air flow volume control value is applied, while the blowout air temperature is being maintained at the target temperature by the throttle control conducted by the cold air flow door and the hot air flow door, the blowout air flow volume can be controlled to the target air flow volume.

As described above, in the structure in which an air flow is sent to the first and the second air passage (18, 19) by the single blower (10), the blowout air flow volume on the first air passage (18) side and the blowout air flow volume on the second air passage (19) side can be excellently and independently controlled by the combination of the air flow volume control of the blower (10) and the throttle control of the door opening degree.

Further, according to the door opening control, only the throttle control of the opening area of one of the first and the second air passage (18, 19) is conducted, and an the opening area of the other passage is not changed. Therefore, in the case where the air flow volume in one of the air passages is changed, a change in the air flow volume in the other air passage can be suppressed to be smaller than that of the prior art disclosed in the official gazette of Japanese Patent No. 2682627.

Furthermore, the door opening control for independently controlling the blowout air flow volumes on the first and the second air passage (18, 19) side can be conducted by using the cold air flow door and the hot air flow door, which fulfill the function of the adjusting means for adjusting the blowout air temperatures of the first and the second air passage (18, 19), as they are. Therefore, it is unnecessary to specially provide a door means for independently controlling the air flow volume of each passage. Accordingly, this structure is very advantageous in reducing the size of the air conditioner for vehicle use and also in reducing the manufacturing cost of the air conditioner.

In this connection, as the rotating speed (the air blast volume) of the motor (12) for driving the blower (10) is increased and decreased by the motor terminal voltage, the air flow volume control value may be specifically a signal of the terminal voltage of the motor (12) for driving the blower (10) or a rotating speed signal of the blower (10).

According to the present invention, when a higher value, between the first air flow volume control value (VBL) and the second air flow volume control value (VBR), is selected and an air flow volume of the blower (10) is determined, the target blowout air flow volume can be ensured by the blower (10) itself in the air passage to which the higher air flow volume control value is applied.

In the present invention, the degree of opening of the cold air flow door and the degree of opening of the hot air flow door may be specifically determined according to the lower air flow volume control value.

The present invention provides an air conditioner for vehicle use, wherein the first air flow volume control value (VBL) is determined according to the target blowout air temperature (TAOL) on the first air passage (18) side, the second air flow volume control value (VBR) is determined according to the target blowout air temperature (TAOR) on the second air passage (19) side, the target air flow volume ratio (SWL) of a cold air flow to a hot air flow on the first air passage (18) side is determined according to the target blowout air temperature (TAOL) on the first air passage (18) side, the target air flow volume ratio (SWR) of a cold air flow to a hot air flow on the second air passage (19) side is determined according to the target blowout air temperature (TAOR) on the second air passage (19) side, a plurality of throttle control characteristics (B1 to B3) are previously set which determines a relation between the degrees of openings of the cold and the hot air flow doors for throttling the passage opening area and the target air flow volume ratio in the air passage to which the lower air flow volume control value is applied, one of the plurality of throttle control characteristics (B1 to B3) is selected according to the ratio of the lower air flow volume control value with respect to the higher air flow volume control value in the first air flow volume control value (VBL) and the second air flow volume control value (VBR), and the degree of opening of the cold air flow door and the degree of opening of the hot air flow door are determined by the target air flow volume ratio according to the thus selected throttle control characteristics (B1 to B3).

As described above, the independent air flow volume control of the first and the second air passage (18, 19) can be excellently realized by using the first and the second air flow volume control value (VBL, VBR), which are determined according to the target blowout air temperature (TAOL) on the first air passage (18) side and the target blowout air temperature (TAOR) on the second air passage (19) side and the target air flow volume ratio (SWL, SWR) of the cold and hot air flows.

The present invention provides an air conditioner for vehicle use comprising:

door operation mechanisms (280 to 310) for respectively independently operating the first cold air flow door (26), the first hot air flow door (24), the second cold air flow door (27) and the second hot air flow door (25); and a control means (50) for controlling the door operation mechanisms (280 to 310) and the blower (10).

Due to the foregoing, when the door operation mechanisms (280 to 310) and the blower (10) are controlled by the control means (50), the independent air flow volume control and the independent temperature control of the first and the second air passages (18, 19) can be automatically conducted.

In the present invention, when the first cold air flow door (26), the first hot air flow door (24), the second cold air flow door (27) and the second hot air flow door (25) are respectively composed of a film door in which the passage opening area is changed by a movement of the film-shaped member (24a to 27a), the door operation space can be reduced and the size of the air conditioner can be effectively decreased.

In the present invention, the first region is a left region in the passenger compartment and the first air passage is a left air passage (18) of the vehicle, the second region is a right region in the passenger compartment and the second air passage is a right air passage (19) of the vehicle, a temperature and an air flow volume of the air blown out from the left air passage (18) of the vehicle are independently controlled by the first cold air flow door (26) and the first hot air flow door (24), and a temperature and an air flow volume of the air blown out from the right air passage (19) of the vehicle are independently controlled by the second cold air flow door (27) and the second hot air flow door (25).

Due to the foregoing, the temperature and the air flow volume of the air blown out into the left region in the passenger compartment can be independently controlled, and the temperature and the air flow volume of the air blown out into the right region in the passenger compartment can be independently controlled.

In this connection, reference numerals in parentheses, in the sentences describing the above means correspond to the specific means described in the embodiment described later.

The present invention may be more fully understood from the description of preferred embodiments of the invention, as set forth below, together with the accompanying drawings.

BRIEF DESCRIPTION OF THE DRAWINGS

In the drawings:

FIG. 3 is a lateral sectional view of a portion of a blower unit and a portion of an air conditioner unit of an embodiment of the present invention;

FIGS. 4A and 4B are a longitudinal sectional view of a cold air flow mixing door and a hot air flow mixing door of an embodiment of the present invention;

DESCRIPTION OF THE PREFERRED EMBODIMENTS

Figure 1:
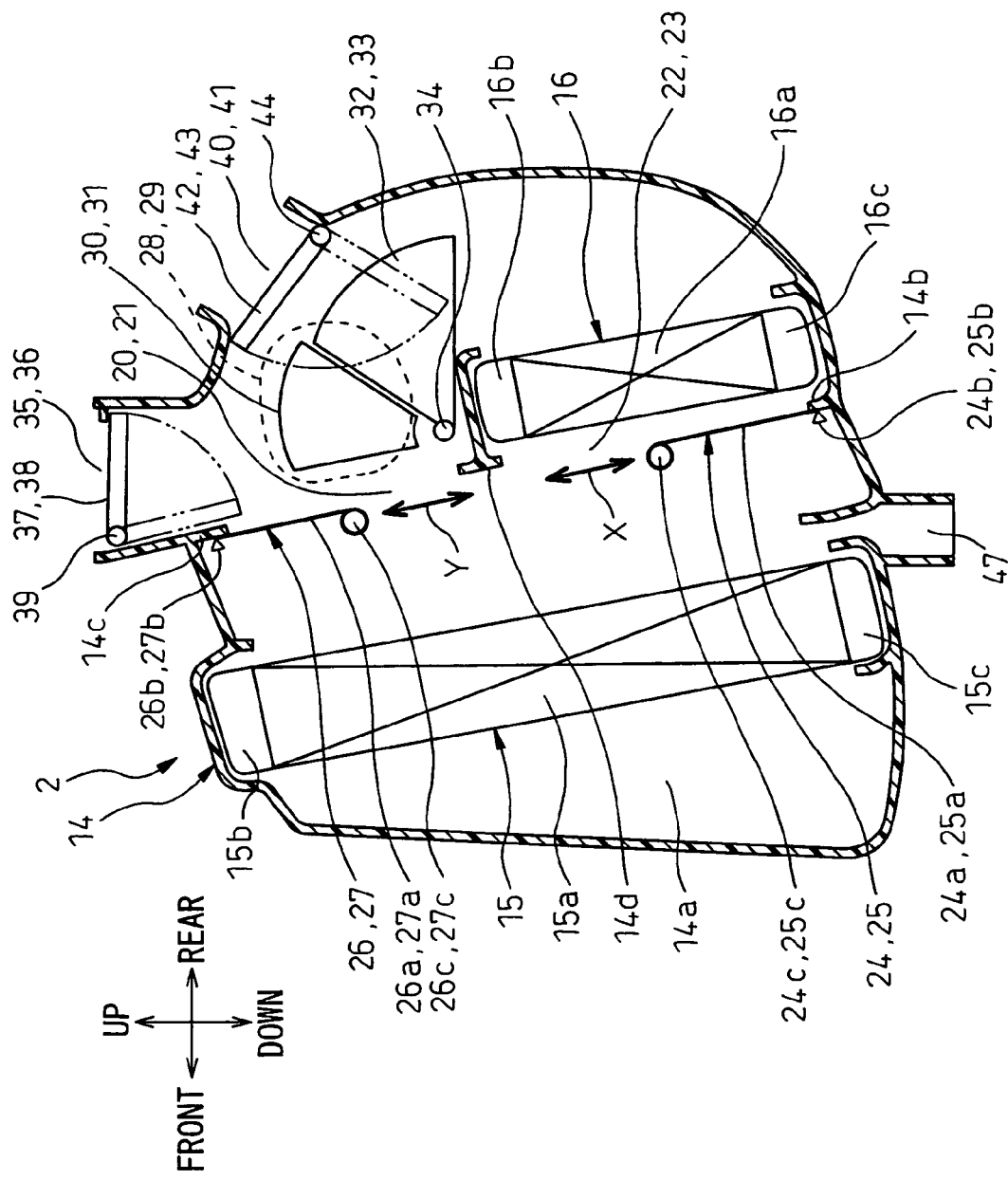
FIG. 1 is a longitudinal sectional view of an air conditioner unit portion of an air conditioner for vehicle use of an embodiment of the present invention.
Figure 2:
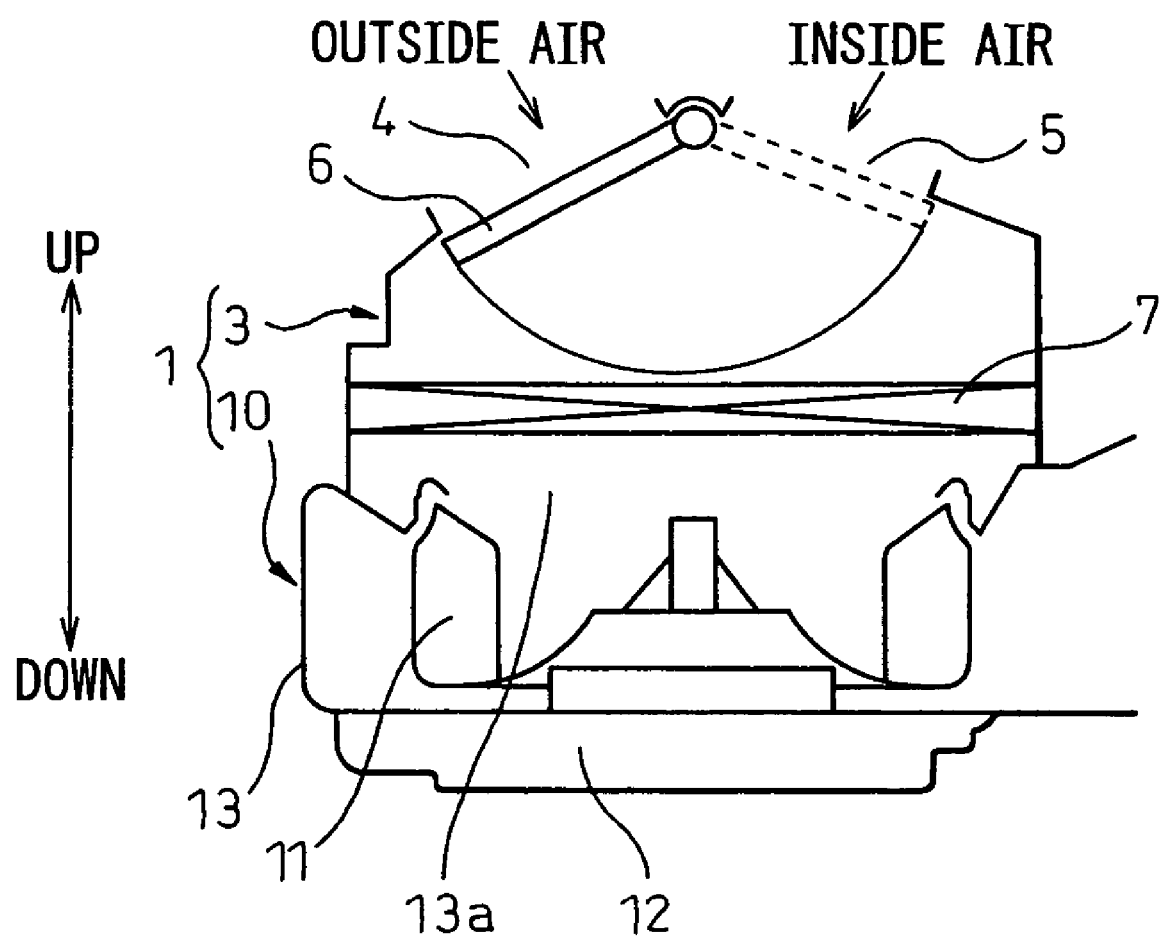
FIG. 2 is a longitudinal sectional view of a blower unit portion of an embodiment of the present invention.

Referring to the accompanying drawings, an embodiment of the present invention will be explained below. FIG. 1 is a longitudinal sectional view of an air conditioner unit 2 portion in an interior unit portion of an air conditioner for vehicle use of an embodiment of the present invention. FIG. 2 is a longitudinal sectional view of a blower unit 1 portion of an interior unit portion. FIG. 3 is a lateral sectional view showing a connection structure of connecting the blower unit 1 with the upstream portion of the air conditioning unit 2.

In this embodiment, the interior unit of the air conditioner for vehicle use is mainly composed of two portions, one is a blower unit 1 and the other is an air conditioning unit 2. In FIGS. 1 to 3, the arrows indicating the front, rear, up and down show directions in a state in which the air conditioning unit 2 is mounted on a vehicle.

The air conditioning unit 2 is arranged in a substantially central portion in the traverse direction of the vehicle inside the instrument panel arranged in the front portion of the passenger compartment. On the other hand, as shown in FIG. 3, the blower unit 1 is arranged, and offset, at a position in the front of the passenger seat which is a side portion of the air conditioning unit 2 in the traverse direction of the vehicle. In this connection, FIG. 3 is a view showing a right-hand steering wheel vehicle in which the passenger seat is located on the left of the vehicle.

As shown in FIG. 2, the blower unit 1 has an inside and outside air switching box 3 which is arranged in the blower unit 1. This inside and outside air switching box 3 includes an outside air introducing port 4, an inside air introducing port 5 and an inside and outside air switching door 6. The outside air introducing port 4 and the inside air introducing port 5 are opened and closed by the inside and outside air switching door 6, so that the outside air and the inside air can be introduced being switched.

The inside and outside air switching door 6 is connected to an inside and outside air switching operation mechanism (not shown) and rotated. This inside and outside air switching operation mechanism is composed of an actuator mechanism in which the servo-motor 6a (shown in FIG. 5 described later) is used. On the lower side of the inside and outside air switching box 3, the filter 7 is arranged for removing dust and offensive smells contained in the air introduced into the inside and outside air switching box 3.

In the blower unit 1, the blower 10 is arranged in a lower portion of the filter 7. This blower 10 includes: an air flowing fan 11 composed of a centrifugal fan in which a larger number of blades are annularly arranged; a motor 12 for driving the air flowing fan 11; a spiral scroll case 13 for accommodating the air flowing fan 11. Therefore, the structure of this blower 10 is well known. In an upper portion of the scroll case 13, the bell-mouth-shaped suction hole 13a, from which the air passing through the filter 7 is sucked, is open.

Next, the air conditioning unit 2 will be explained below. The air conditioning unit 2 includes a case 14 made of resin. This case 14 is usually composed in such a manner that the case body is divided into two pieces on the dividing face (not shown) located at the center of the case 14 in the traverse direction of the vehicle, and the thus divided case bodies are integrally connected to each other by an appropriate fastening means such as a metallic spring cramp or screw.

In the front portion of the case 14, the air entrance space 14a, to which the air outlet portion of the scroll case 13 is connected, is formed. Accordingly, when the air flowing fan 11 in the blower unit 1 is operated, air flows into the space 14a in the front portion of the case 14.

In the case 14, the air sent from the blower unit 1 flows from the front portion side of the vehicle to the rear portion side. In the case 14, the evaporator 15 and the heater core 16 are arranged in series in this order.

This evaporator 15 composes a well known refrigerating cycle together with the compressor, the condenser and the pressure reducing means which are not shown in the drawing. The evaporator 15 is a heat exchanger for cooling the air in the case 14. The evaporator 15 is composed in such a manner that the heat exchanging core portion 15a, which is composed of flat tubes in which the low pressure refrigerant decompressed by the pressure reducing means flows and also composed of corrugated fins jointed to the flat tubes, is arranged between the upper and the lower tank portion 15b, 15c.

The heater core 16 is a heat exchanger for heating air in the case 14 while hot water (the engine cooling water) flowing in the heater core is being used as the heat source. As is well known, the heater core 16 is composed in such a manner that the heat exchanging core portion 16a, which is composed of flat tubes in which the hot water flows and also composed of corrugated fins jointed to the flat tubes, is arranged between the upper and the lower tank portion 16b, 16c.

As shown in FIG. 3, the air passage on the downstream side (the rear side of the evaporator 15 in the case 14 is partitioned into the left air passage 18 and the right air passage 19 by the central partitioning plate 17. As described before, FIG. 3 shows an example in which the air conditioner is mounted on a right-hand steering wheel vehicle. Therefore, the left air passage 18 composes the passenger side air passage, and the right air passage 19 composes the driver's side air passage.

Next, explanations will be made into the right and left temperature adjusting mechanisms for adjusting the temperatures of the air blown out from the left air passage 18 and the right air passage 19 into the passenger compartment. When the height of the heater core 16 is made to be approximately ½ of the height of the evaporator 15 and the heater core 16 is arranged in the lower side space in the case 14, in the left air passage 18 and the right air passage 19, on the upper side of the heater core 16, the left cold air flow passage 20 and the right cold air flow passage 21 (shown in FIG. 1) are formed. Both the cold air flow passages 20, 21 are used for making a cold air flow while the cold air flow is bypassing the heater core 16.

In the left air passage 18 and the right air passage 19, on the lower side of the left cold air flow passage 20 and the right cold air flow passage 21, the left hot air flow passage 22 and the right hot air flow passage 23 (shown in FIG. 1) are formed in parallel with each other. In these hot air flow passages 22, 23, hot air flows flow which have been heated by the heater core 16.

The left hot air flow air mixing door 24 is arranged in an upstream portion of the heater core 16 in the left air passage 18, and the right hot air flow air mixing door 25 is arranged in the upstream portion of the heater core 16 in the right air passage 19.

The left cold air flow air mixing door 26 is arranged in the upper portion of the left hot air flow air mixing door 24 in the left air passage 18, and the right cold air flow air mixing door 27 is arranged in an upper portion of the right hot air flow air mixing door 25 in the right air passage 19.

Next, referring to FIGS. 4A and 4B, the specific constitution of the left and the right hot air mixing doors 24, 25 and the left and the right cold air mixing doors 26, 27 will be explained below. In the example shown in FIGS. 4A and 4B, all the air mixing doors 24 to 27 are composed of film doors in which thin-film members 24a to 27a are used.

In the left and the right hot air mixing doors 24, 25, end portions of the thin-film members 24a, 25a, that is, the lower end portions of the thin film members 24a, 25a are fixed to the lower end portion (a portion of the case 14) 14b in the entrance opening portions of the hot air flow passages 22, 23 by the appropriate fixing members 24b, 25b. In the left and the right air mixing doors 26, 27, end portions of the thin film members 26a, 27a, that is, the upper end portions of the thin film members 26a, 27a are fixed to the upper end portion (a portion of the case 14) 14c of the entrance opening portions of the cold air passages 20, 21 by the appropriate fixing members 26b, 27b.

The other end portions of the thin film members 24a, 25a of the left and right hot air flow air mixing doors 24, 25, that is, the upper end portions are connected to the winding shafts 24c, 25c. The other end portions of the thin film members 24a, 25a are wound round the winding shafts 24c, 25c. Alternatively, the other end portions of the thin film members 24a, 25a are unwound from the winding shafts 24c, 25c.

The other end portions of the thin film members 26a, 27a of the left and the right cold air flow air mixing doors 26, 27, that is, the lower end portions are connected to the winding shafts 26c, 27c. The other end portions of the thin film members 26a, 27a are wound round the winding shafts 26c, 27c. Alternatively, the other end portions of the thin film members 26a, 25s are unwound from the winding shafts 26c, 27c.

In this connection, concerning the material of the thin film members 24a to 27a, as long as it is a flexible film member made of resin capable of being wound round the winding shafts 24c to 27c, various materials can be used. For example, preferable examples of the thin film members are: a PET film (polyethylene terephthalate film), and a PPS film (polyphenylene sulfide film). The thickness of the thin film members 24a to 27a is approximately 200 μm.

The hot air flow winding shafts 24c, 25c are moved while being rotated in the direction in which the hot air flow winding shafts 24c, 25c come close to and separate from the stationary portion 14b of end portions of the hot air flow thin film members 24a, 25a, that is, while the hot air flow winding shafts 24c, 25c are rotating in the opening and closing direction X (the direction of up and down in FIG. 1) of the hot air flow passages 22, 23.

In the same manner, the cold air flow winding shafts 26c, 27c are moved while being rotated in the direction in which the cold air flow winding shafts 26c, 27c come close to and separate from the stationary portion 14c of end portions of the cold air flow thin film members 26a, 27a, that is, while the cold air flow winding shafts 26c, 27c are rotating in the opening and closing direction Y (the direction of up and down in FIG. 1) of the cold air flow passages 20, 21.

The hot air flow winding shafts 24c, 25c and the cold air flow winding shafts 26c, 27c are respectively connected to the independent door operation mechanisms. Therefore, while four winding shafts 24c to 27c are respectively independently being rotated, they are moved in the vertical direction (X-Y direction).

Figure 5:
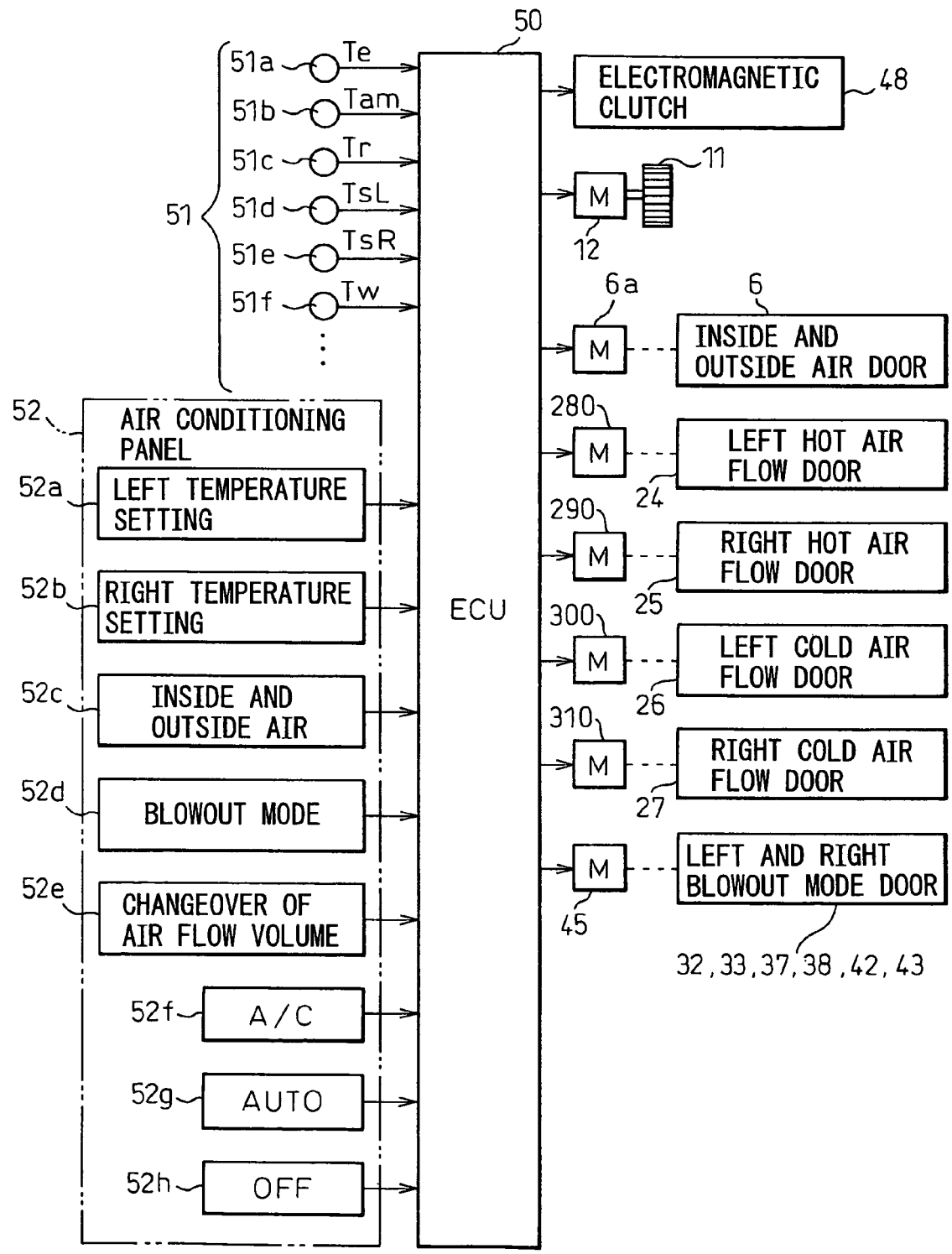
FIG. 5 is a block diagram of an electrical control section of an embodiment of the present invention.

The door operation mechanisms respectively have servo-motors 280 to 310 (shown in FIG. 5 described later). When the rotation of each servo-motor 280 to 310 is controlled, the rotation of each winding shaft 24c to 27c is controlled. Due to the foregoing, the moving position in the vertical direction X, Y of each winding shaft 24c to 27c is controlled.

In this connection, concerning the mechanism by which each winding shaft 24c to 27c is moved in the vertical direction X, Y while being rotated by the rotation of the servo-motors 280 to 310, various mechanisms can be used and, for example, a worm-gear mechanism can be used.

Specifically, the following structure may be adopted. A worm shaft (not shown) rotated by the servo-motors 280 to 310 is perpendicularly arranged corresponding to each winding shaft 24c to 27c, and a worm wheel meshing with the worm of this worm shaft is arranged at an end portion of each winding shaft 24c to 27c. Due to the above structure, when the worm shaft is rotated, each winding shaft 24c to 27c can be moved in the vertical direction X, Y while the winding shaft is being rotated.

In the left and the right hot air flow air mixing doors 24, 25, when the hot air flow winding shafts 24c, 25c are moved in the vertical direction X, the positions of the other end portions of the hot air flow thin film members 24a, 25a are displaced, and the opening areas S1 (shown in FIG. 4A) of the hot air flow passages 22, 23 are increased and decreased.

In the same manner, in the left and the right cold air flow air mixing doors 26, 27, when the cold air flow winding shafts 26c, 27c are moved in the vertical direction Y, the positions of the other end portions of the cold air flow thin film members 26a, 27a are displaced, and the opening areas S2 (shown in FIG. 4A) of the cold air flow passages 20, 21 are increased and decreased.

When a ratio of the opening area S1 of the hot air flow passage 22, 23 to the opening area S2 of the cold air flow passage 20, 21 is adjusted, a ratio of the volume of the hot air flow flowing in the hot air flow passages 22, 23 to the volume of the cold air flow flowing in the cold air flow passages 20, 21 is adjusted.

In this connection, in FIGS. 1 and 4A, the partition wall 14d partitions the cold air flow passages 20, 21 and the hot air flow passages 22, 23. This partition wall 14d can be formed being integrated with the case 14 into one body. When the hot air flow winding shafts 24c, 25c are moved to the forward end position of this partition wall 14d, the hot air flow passages 22, 23 are completely closed by the hot air flow thin film member 24a, 25a. When the cold air flow winding shafts 26c, 27c are moved to the forward end position of this partition wall 14d, the cold air flow passages 20, 21 are completely closed by the cold air flow thin film member 26a, 27a.

In the left air passage 18 and the right air passage 19 formed in the case 14, the air mixing portions 28, 29 (shown in FIG. 1) are formed on the downstream side (the rear side of the vehicle) of the cold air flow passages 20, 21. In these left and right air mixing portions 28, 29, the hot air flow and the cold air flow in the left and the right air passages 18, 19 are mixed with each other.

In the left and the right side wall portion of the case 14, in the portions on the left and the right of the air mixing portions 28, 29, the left and the right foot opening portions 30, 31 are open. A conditioned air flow is blown out from the left and the right foot opening portions 30, 31 toward the feet of the passengers. The left and the right foot opening portions 30, 31 provided on both sides are opened and closed by the left and the right foot doors 32, 33.

In this case, the shapes of the foot opening portions 30, 31 and the foot doors 32, 33 are formed into a sector in this embodiment. When the sector-shaped foot doors 32, 33 on the left and the right are rotated round the rotary shaft 34 along the left and the right side wall portion of the case 14, the foot opening portions 30, 31 on the left and the right are opened and closed. In FIG. 1, the solid line of the foot doors 32, 33 shows a state of the foot opening portions 30, 31 completely opened. When the foot doors 32, 33 are rotated counterclockwise from this solid line position, the foot opening portions 30, 31 are closed.

In the case 14, the left and the right defroster opening portions 35, 36 are open to the upper portions of the air mixing portions 28, 29. Conditioned air is blown out from these defroster opening portions 35, 36 toward the windshield of the vehicle. The left and the right defroster opening portions 35, 36 are opened and closed by the left and the right defroster doors 37, 38. The defroster doors 37, 38 are composed of a plate door capable of being rotated round the rotary shaft 39.

In the case 14, on the rear side wall faces located obliquely above the air mixing portions 28, 29, the left and the right face opening portions 40, 41 are open. A flow of conditioned air is blown out from the left and the right face opening portions 40, 41 toward the upper half of the body of the passenger. The left and the right face opening portions 40, 41 are opened and closed by the left and the right face doors 42, 43. The face doors 42, 43 are respectively composed of a plate door capable of being rotated round the rotary shaft 44.

In this embodiment, the left and the right blowout mode are switched by being linked with each other. Therefore, the left and the right foot doors 32, 33, the left and the right defroster doors 37, 38 and the left and the right face doors 42, 43 are connected to the blowout mode operation mechanism which are used in common between the left and the right, so that all the blowout mode doors 32, 33, 37, 38, 42, 43 on the left and the right are operated being linked with each other.

More particularly, the blowout mode operation mechanism, which is used in common between the left and the right, includes a single servo-motor 45 (shown in FIG. 5); and a link mechanism (not shown) for transmitting the rotation of the servo-motor 45 to the doors described above. When the rotation of this servo-motor 45 is controlled, the doors are opened and closed via the link mechanism. In this connection, the drain hole 47 for discharging the condensed water generated in the evaporator 15 is open to the bottom portion of the case 14.

Next, referring to FIG. 5, the electrical control unit of this embodiment will be briefly explained below. The air conditioning control unit 50 is a control means composed of a well known microcomputer and its peripheral circuit including a CPU, a ROM and a RAM. In the ROM, a control program for conducting air conditioning control is stored. According to this control program, various calculations are executed.

Figure 6:
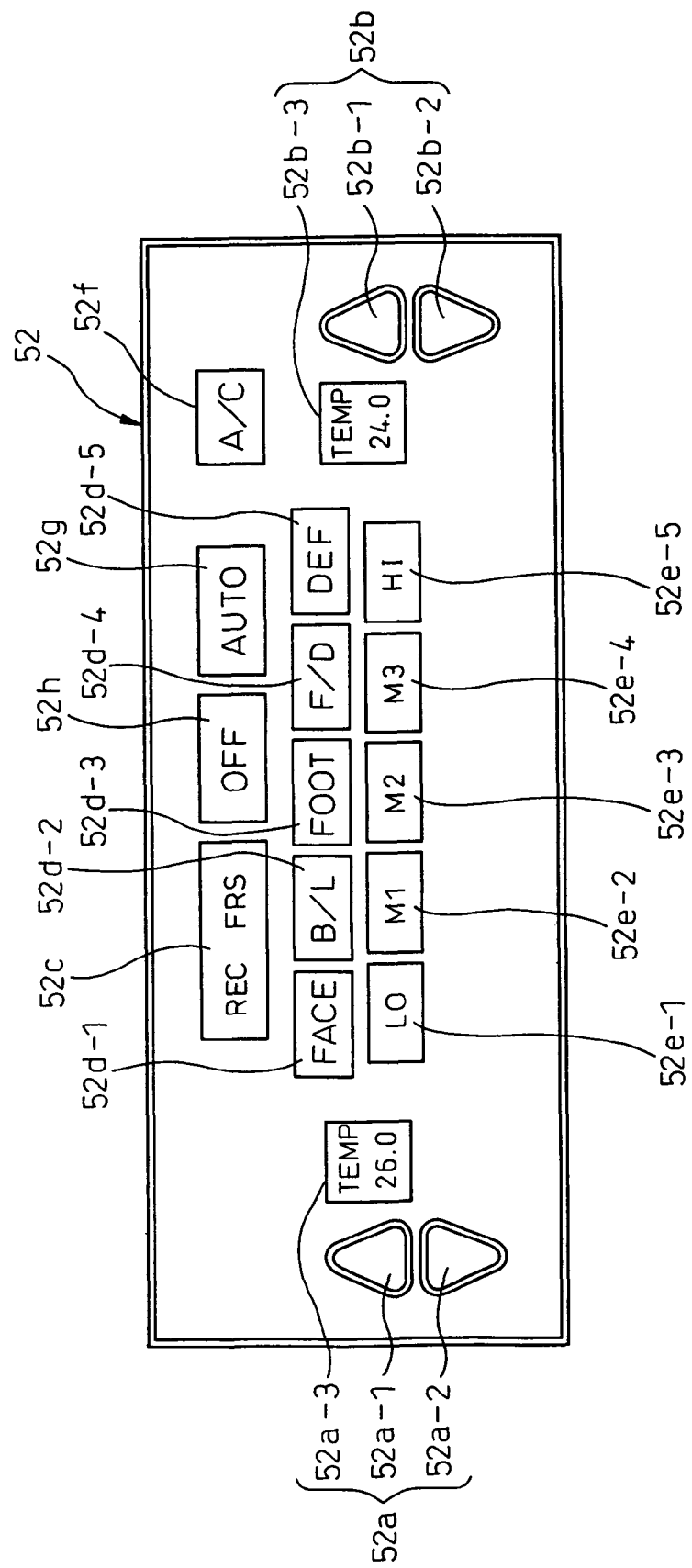
FIG. 6 is a front view showing a specific example of an air conditioning panel of an embodiment of the present invention.

Into the input side of the air conditioning control unit 50, the sensor detection signals are inputted from the sensor group 51 and, further, the operation signals are inputted from the air conditioning panel 52. FIG. 6 is a view showing a specific example of the structure of the air conditioning panel 52.

The sensor group 51 includes: an evaporator temperature sensor 51a for detecting the temperature $T_e$ of air blown out from the evaporator 15; an outside air temperature sensor 51b for detecting the outside air temperature $T_{am}$; an inside air temperature sensor 51c for detecting the inside air temperature $T_r$; a left sunshine sensor 51d for detecting the sunshine $T_sL$ in the left region of the passenger compartment; a right sunshine sensor 51e for detecting the sunshine $T_sR$ in the right region of the passenger compartment; and a water temperature sensor 51f for detecting the temperature $T_w$ of hot water flowing into the heater core 16.

The air conditioning panel 52 is arranged close to the instrument panel (not shown) located in the front portion of the driver's seat in the passenger compartment. This air conditioning panel 52 includes the following switches 52a to 52h which are operated by the passenger. The left temperature setting switch 52a outputs a signal of the setting temperature $T_{set}L$ of the left region in the passenger compartment. The right temperature setting switch 52b outputs a signal of the setting temperature $T_{set}R$ of the right region in the passenger compartment.

In the specific example shown in FIG. 6, the left and the right temperature setting switches 52a, 52b include: temperature rise knobs 52a-1, 52b-1; temperature fall knobs 52a-2, 52b-2; and setting temperature display portions 52a-3, 52b-3.

The inside and outside air changeover switch 52c outputs a signal for manually setting the inside air mode and the outside air mode conducted by the inside and the outside air changeover door 6.

The blowout mode switch 52d outputs signals of the blowout mode in which air is blown out from the left air passage 18 and the right air passage 19 into the left and the right regions in the passenger compartment, that is, the blowout mode switch 52d outputs signals for manually setting the well known face mode, bilevel mode, foot mode, foot defroster mode and defroster mode. In the specific example shown in FIG. 6, the operation knobs 52d-1 to 52d-5 corresponding to the modes are independently provided.

The air flow volume changeover switch 52e outputs a signal for changing a terminal voltage of the motor 12 for driving the blower 10. When the terminal voltage of the motor 12 to drive the blower 10 is changed, the rotating speed of the blower 10 is changed, so that a volume of the air flow of the blower 10 can be changed over.

In the specific example shown in FIG. 6, the air flow volume changeover switch 52e includes: a small air flow volume knob 52e-1 for outputting a signal of a small air flow volume ($L_o$); a first intermediate air flow volume knob 52e-2 for outputting a signal of the first intermediate air flow volume (M1) which is larger than the small air flow volume ($L_o$) by a predetermined volume; a second intermediate air flow volume knob 52e-3 for outputting a signal of the second intermediate air flow volume (M2) which is larger than the first intermediate air flow volume (M1) by a predetermined volume; a third intermediate air flow volume knob 52e-4 for outputting a signal of the third intermediate air flow volume (M3) which is larger than the second intermediate air flow volume (M2) by a predetermined value; and a large air flow volume knob 52e-5 for outputting a signal of the large air flow volume ($H_i$) which is larger than the third intermediate air flow volume (M3) by a predetermined value.

The air conditioning switch 52f outputs a signal of turning on and off the electromagnetic clutch 48 of the compressor (not shown) in the refrigerating cycle in which the evaporator 15 is provided, so that the operation of the compressor can be turned on and off. The auto switch 52g outputs a command signal of automatically controlling the air conditioning operation. The off switch 52h outputs a stop signal of stopping the air conditioning operation.

The output side of the air conditioning control unit 50 is connected to the electromagnetic clutch 48 of the compressor, the motor 12 for driving the blower 10 and the servo-motors 6a, 280 to 310, 45 which are the electrical drive means for driving the devices. Therefore, the operation of these devices is controlled by the output signals of the air conditioning unit 50.

Next, the operation of this embodiment composed as described above will be explained below. First, the operation of the interior unit portion (the portion of the blower unit 1 and the air conditioning unit 2) of the air conditioner for vehicle use will be briefly explained as follows. When the blower 10 is operated, the air, which has been introduced from the outside air introducing opening 4 or the inside air introducing opening 5, passes through the left air passage 18 and the right air passage 19 in the case 14 and is sent toward the passenger compartment.

Then, after the electromagnetic clutch 48 has been energized and the electromagnetic clutch 48 has been put into a connecting condition, the compressor in the refrigerating cycle is driven by the vehicle engine. In this way, the refrigerating cycle, into which the evaporator 15 is incorporated, is put into an operating condition.

In the case where the maximum cooling state is set in which the blowout air to the left region of the passenger compartment is cooled at the maximum according to the control output of the air conditioning control unit 50, the winding shaft 26c of the left cold air flow air mixing door 26 is moved to the uppermost position by the rotation of the servo-motor 300. In other words, the winding shaft 26c is moved to the closest position to the fixing position (the position of the fixing member 26b) of one end portion of the thin film member 26a.

At this time, the winding shaft 26c is moved upward being rotated clockwise in FIG. 1. Due to the foregoing, the thin film member 26a is wound round the winding shaft 26c at the maximum, and the left cold air flow air mixing door 26 completely opens the left cold air flow passage 20.

At the same time, the winding shaft 24c of winding the left hot air flow air mixing door 24 is moved to the uppermost position (the front end position of the partition wall 14d) by the rotation of the servo-motor 28. In other words, the winding shaft 24c is moved to a position which is the most distant from the fixing position (the position of the fixing member 24b) of one end portion of the thin film member 24a.

At this time, the winding shaft 24c is moved upward by being rotated clockwise in FIG. 1. Due to the foregoing, the thin film member 24a is unwound from the winding shaft 24c to the maximum, that is, the thin film member 24a is rewound from the winding shaft 24c to the maximum, and the thin film member 24a completely closes the left hot air flow passage 22.

As a result, in the left air passage 18, all the cold air flow cooled by the evaporator 15 passes through the cold air flow passage 20 and blows out from the left blowout opening portions 30, 35, 40 into the left region in the passenger compartment. Therefore, the maximum cooling performance can be exhibited in the left region in the passenger compartment. In this connection, at the time of the maximum cooling, the face mode is usually selected. Therefore, a cold air flow is blown out from the left face opening portion 40 toward the upper half of the body of the passenger in the left region in the passenger compartment.

Next, in the case where the maximum heating state is set in which the blowout air to the left region of the passenger compartment is heated at the maximum according to the control output of the air conditioning control unit 50, the winding shaft 26c of the left cold air flow air mixing door 26 is moved to the lowermost position (the front end position of the partition wall 14d) by the rotation of the servo-motor 300. In other words, the winding shaft 26c is moved to the most distant position from the fixing position (the position of the fixing member 26b) of one end portion of the thin film member 26a.

At this time, the winding shaft 26c is moved downward by being rotated counterclockwise in FIG. 1. Due to the foregoing, the thin film member 26a is unwound from the winding shaft 26c to the maximum, that is, the thin film member 26a is rewound from the winding shaft 26c to the maximum, and the left cold air flow air mixing door 26 completely closes the left cold air flow passage 20.

At the same time, the winding shaft 24c for winding the left hot air flow air mixing door 24 is moved to the lowermost position by the rotation of the servo-motor 28. In other words, the winding shaft 24c is moved to a position which is the closest to the fixing position (the position of the fixing member 24b) of one end portion of the thin film member 24a. At this time, the winding shaft 24c is moved downward by being rotated counterclockwise in FIG. 1. Due to the foregoing, the thin film member 24a is wound round the winding shaft 24c to the maximum, and the thin film member 24a completely opens the left hot air flow passage 22.

As a result, in the left air passage 18, all the air which has passed through the evaporator 15 flows into the left hot air flow passage 22 and becomes a hot air flow by being heated by the heater core 16. Then the air is blown out from the left blowout opening portions 30, 35, 40 into the left region in the passenger compartment. Accordingly, the maximum heating performance can be exhibited in the left region in the passenger compartment. In this connection, at the time of the maximum heating, the foot mode is usually selected. Therefore, a hot air flow is blown out from the left foot opening portion 30 to the foot portion of the passenger in the left region in the passenger compartment.

Next, when the air conditioning operation is put into a steady state after the start of air conditioning operation and a period of time has passed or alternatively in the intermediate season such as spring or autumn, the temperature of the blowout air to the left region in the passenger compartment is controlled into an intermediate temperature region. In this case, the winding shaft 24c of the left hot air flow air mixing door 24 and the winding shaft 26c of the left cold air flow air mixing door 26 are respectively moved to the intermediate opening degree positions (shown in FIG. 1) of the left hot air flow passage 22 and the left cold air flow passage 20.

Due to the foregoing, a ratio of the opening area S1 of the left hot air flow passage 22 to the opening area S2 of the left cold air flow passage 20 can be set at a predetermined value. Therefore, the temperature of the left blowout air can be controlled at a predetermined intermediate temperature by adjusting the ratio of the hot air flow volume to the cold air flow volume.

The blowout air temperature control in the left air passage 18 is explained above. In the same manner, the blowout air temperature can be also independently controlled in the right air passage 19.

Next, the independent control for controlling an air flow volume in the left air passage 18 and the right air passage 19 will be explained referring to FIGS. 4A and 4B. FIGS. 4A and 4B are views showing a case in which a volume of the air flow in one of both passages 18 and 19 is changed, for example, only a volume of the air flow in the left air passage 18 is changed. FIG. 4A is a view showing a state in which the volume of air is small, and FIG. 4B is a view showing a state in which the volume of air is large.

In FIG. 4A, the winding shaft 24c of the left hot air flow air mixing door 24 and the winding shaft 26c of the left cold air flow air mixing door 26 are respectively moved to a predetermined intermediate position. When the opening area of the left hot air flow passage 22 is expressed by S1 and the opening area of the left cold air flow passage 20 is expressed by S2, the ratio z (z=S1/S2) is maintained at a predetermined ratio, so that the left blowout air temperature can be controlled at a predetermined intermediate temperature.

On the other hand, in FIG. 4B, both the winding shaft 24c of the left hot air flow air mixing door 24 and the winding shaft 26c of the left cold air flow air mixing door 26 are moved to the side on which the passage opening area is increased as compared with the case shown in FIG. 4A. That is, the opening area of the left hot air flow passage 22 is increased from S1 to S1', and the opening area of the left cold air flow passage 20 is increased from S2 to S2'. At this time, the opening areas of both passages 22, 20 are increased while the area ratio z is being maintained constant, that is, the opening areas of both passages 22, 20 are increased while the relation of (S1/S2)=(S1'/S2') is being maintained.

Accordingly, as the ratio of the cold air flow volume to the hot air flow volume can be maintained constant, when only the passage area of the left air passage 18 is changed without changing the blowout air temperature in the left air passage 18, only the blowout air volume in the left air passage 18 can be changed. In FIG. 4A, the passage area of the left air passage 18 is decreased, and the blowout air volume can be set at a small volume. In FIG. 4B, the passage area of the left air passage 18 is increased, and the blowout air volume can be set at a large volume.

At this time, the left hot air flow air mixing door 24 and the left cold air flow air mixing door 26 change only the passage area of the left air passage 18 and do not change the passage area of the right air passage 19. Therefore, even when a blowout air flow volume of the left air passage 18 is changed, a change in the blowout air flow volume in the right air passage 19 can be suppressed to be very small.

In the same manner as that described above, in the right air passage 19, while a ratio of the opening area of the right hot air flow passage 23 to the opening area of the right cold air flow passage 21 is being maintained constant, when the operating positions of the right hot air flow air mixing door 25 and the right cold air flow air mixing door 27 are changed so as to increase and decrease the passage areas of both passages 23, 21, only the blowout air flow volume of the right blowout air can be changed.

Accordingly, while the air mixing doors 24 to 27, which fulfill the function of controlling the blowout air temperature, are being used as they are, the blowout air flow volumes of the left and the right passage 18, 19 can be independently changed. Accordingly, it is unnecessary to provide an exclusive door means for changing the air flow volume, and the product cost can be reduced, and further the air conditioning unit 2 can be downsized, which is very advantageous for practical use.

The above explanations are made as follows. While the ratio of the opening area of the hot air flow passage 22, 23 to the opening area of the cold air flow passage 20, 21 is being maintained constant, when the passage area of the air passage 18, 19 is changed, only the blowout air flow volume of the air passage 18, 19 can be changed without changing the blowout air temperature of the air passage 18, 19. However, the left air passage 18 and the right air passage 19 are not simple linear passages. Actually, the left air passage 18 and the right air passage 19 are complicated curved passages as shown in FIG. 1.

Therefore, according to the experimental investigation made by the present inventors, even when the above ratio of the opening area is maintained constant, the ratio of the air flow volume of the hot air flow passage 22, 23 to the air flow volume of the cold air flow passage 20, 21 is changed according to the displacements of the air mixing doors 24 to 27, and the blowout air temperature is changed in some cases.

Accordingly, the present inventors found the following. In order to change only the blowout air flow volume and in order not to change the blowout air temperature, the ratio of the opening area of the hot air flow passage 22, 23 to the opening area of the cold air flow passage 20, 21 is not always maintained constant but somewhat changed according to the displacements of the air mixing doors 24 to 27 so that the ratio of the cold air flow volume to the hot air flow volume can be maintained constant.

The change in the ratio of the opening area according to the change in the blowout air flow volume is determined according to the specific air passage form of the air conditioning unit 2. Therefore, the blowout air temperature and the blowout air flow volume are measured for each objective air conditioning unit 2, and the most appropriate opening area ratio is experimentally determined so that the maintenance of the blowout air temperature and the change in the blowout air flow volume can be made to be compatible with each other.

Figure 7:
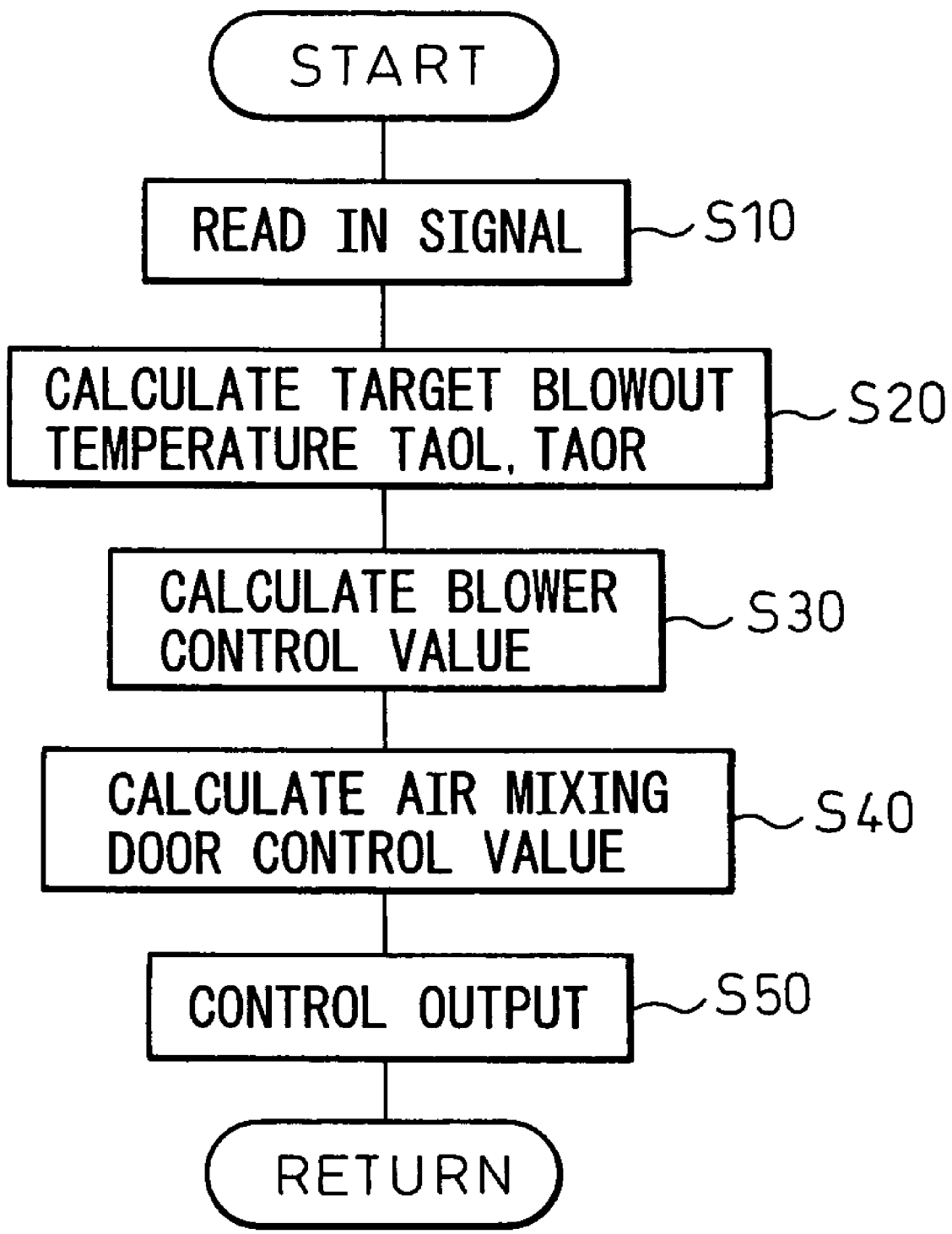
FIG. 7 is a flow chart showing a basic routine of air conditioning automatic control of an embodiment of the present invention.

Next, a specific example of automatic air conditioning control conducted by the air conditioning control unit 50 will be explained as follows. FIG. 7 is a control routine executed by the microcomputer of the air conditioning control unit 50. This control routine is started by turning on the auto switch 52g. First, in step S10, detection signals detected by the sensor group 51 and various operation signals sent from the air conditioning panel 52 are read in.

Next, in step S20, the target blowout temperatures TAOL, TAOR of the blowout air to the passenger compartment are calculated. In this case, TAOL is the target blowout temperature of air blown out from the left air passage 18 to the left region in the passenger compartment, and TAOR is the target blowout temperature of air blown out from the right air passage 19 to the right region in the passenger compartment.

The left target blowout temperature TAOL is the blowout air temperature necessary for maintaining the left region in the passenger compartment at the left setting temperature $T_{set}L$ which is set by the left temperature setting switch 52a irrespective of the fluctuation of the thermal load of air conditioning. In the same manner, the right target blowout temperature TAOR is the blowout air temperature necessary for maintaining the right region in the passenger compartment at the right setting temperature $T_{set}R$ which is set by the right temperature setting switch 52b irrespective of the fluctuation of the thermal load of air conditioning.

As is well known, the above left target blowout temperature TAOL is calculated by the following expression (1) according to the left setting temperature $T_{set}L$, the outside air temperature $T_{am}$ and the inside air temperature $T_r$ and the left sunshine $T_sL$ detected by the sensors 51b, 51c, 51d.

$$TAOL = K_{set} \times T_{set}L - K_r \times T_r - K_{am} \times T_{am} - K_s \times T_s L + C \tag{1}$$

where $K_{set}$, $K_r$, $K_{am}$, $K_s$: Control gain
C: Constant for correction In the same manner, the above right target blowout temperature TAOR is calculated according to the right setting temperature $T_{set}R$, the outside air temperature $T_{am}$ and the inside air temperature $T_r$ and the right sunshine $T_sR$ detected by the sensors 51b, 51c, 51e. In this case, the calculating expression to calculate the right target blowout temperature TAOR is obtained only when "$T_{set}L$" in the above expression is replaced by "$T_{set}R$" and when "$T_sL$" in the above expression is replaced by "$T_sR$". Therefore, the calculating expression to calculate the right target blowout temperature TAOR is omitted here.

Next, in step S30, the control value of controlling the blower 10 is calculated according to the aforementioned TAOL and TAOR. A specific example of the control processing conducted in step S30 will be described later referring to FIG. 8. Next, in step S40, the control values of controlling the left and the right air mixing doors 24 to 27 are calculated according to TAOL and TAOR. A specific example of the control processing conducted in step S40 will be described later referring to FIG. 10.

Next, in step S50, the control values calculated in the above steps S30 and S40 are outputted to the motor 12 for driving the blower and the servo-motors 280 to 310 for driving the air mixing doors, so that the rotating speed of the motor 12 for driving the blower can be controlled and the degree of the opening of the air mixing doors 24 to 27 can be controlled.

In this connection, although not shown in FIG. 7, the switching control of switching the inside and the outside air introducing mode conducted by the inside and the outside switching door 6, the blowout mode switching control conducted by the blowout mode doors 32, 33, 37, 38, 42, 43 and the compressor operation control conducted by the electromagnetic clutch 48 are executed by well known methods.

Next, referring to FIG. 8, the control value calculation processing of the blower 10 will be specifically explained below. In step S310, according to the left target blowout temperature TAOL, the left motor terminal voltage level VML is calculated, and according to the right target blowout temperature TAOR, the right motor terminal voltage level VMR is calculated.

Figure 9:
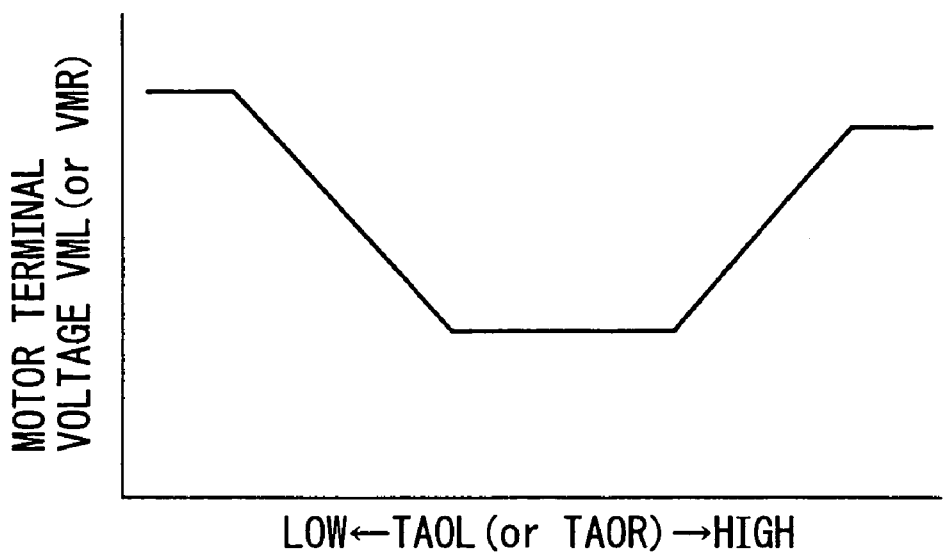
FIG. 9 is a control characteristic diagram of controlling a blower motor terminal voltage of an embodiment of the present invention.

VML and VMR are specifically calculated according to the map shown in FIG. 9. That is, the left motor terminal voltage level VML is determined so that it can be raised to the maximum value on the low and the high temperature side of TAOL and it can be lowered to the minimum value in the intermediate temperature region of TAOL. In the same manner, the right motor terminal voltage level VMR is determined according to the change in TAOR.

Next, in step S320, the left motor terminal voltage level VML and the right motor terminal voltage level VMR are compared with each other, and the higher one is finally selected as the motor terminal voltage level.

The rotating speed of the motor is increased and decreased according to the increase and decrease in the terminal voltage of the motor of the blower 10. As a result, a volume of the air flow sent from the blower 10 is increased and decreased. Therefore, the volume of the air flow sent from the blower 10 is automatically controlled according to TAOL and TAOR so that the volume of the air flow sent from the blower 10 can be the maximum value ($H_i$) on the low temperature and the high temperature side of TAOL and TAOR and the volume of the air flow sent from the blower 10 can be the minimum ($L_o$) in the intermediate temperature region of TAOL and TAOR.

In this connection, in general, as compared with the required volume of the air flow to be blown out at the time of the maximum cooling, the required volume of the air flow to be blown out at the time of the maximum heating may be small. Therefore, in the control characteristic (the map) of the terminal voltage of the motor of the blower shown in FIG. 9, as compared with the maximum value of the terminal voltage of the motor on the low temperature side of TAOL and TAOR, the maximum value of the terminal voltage of the motor on the high temperature side is lowered by a predetermined value.

Next, referring to FIG. 10, the control value calculation processing of controlling the left and the right air mixing door 24 to 27 will be specifically explained below. In step S410, the target air flow volume ratio SWL of the left air mixing doors 24, 26 is calculated, and the target air flow volume ratio SWR of the right air mixing doors 25, 27 is calculated.

In this case, the target air flow volume SWL of the left air mixing doors 24, 26 is expressed by the percentage of the cold air flow mixing ratio in which the target air flow volume SWL is 0% in the left maximum cooling state (the hot air flow ratio: 0%) and the target air flow volume SWL is 100% in the left maximum heating state (the hot air flow ratio: 100%). In this case, in the left maximum cooling state, the left hot air flow passage 22 is completely closed by the left hot air flow air mixing door 24. Further, in the left maximum heating state, the left hot air flow passage 22 is completely opened by the left hot air flow air mixing door 24, and the left cold air flow passage 20 is completely closed by the left cold air flow air mixing door 26.

The target air flow volume ratio SWL of the left air mixing doors 24, 26 is calculated by the following expression (2) according to the left target blowout temperature TAOL, the evaporator blowout air temperature $T_e$ detected by the evaporator temperature sensor 51a and the hot water temperature $T_w$ detected by the water temperature sensor 51f.

$$SWL = \{(TAOL - T_e)/(T_w - T_e)\} \times 100 \; (\%) \tag{2}$$

In the same manner, the target air flow volume ratio SWR of the right air mixing doors 25, 27 is expressed by the percentage of the cold air flow mixing ratio in which the target air flow volume SWR is 0% in the right maximum cooling state and further the target air flow volume SWR is 100% in the right maximum heating state. When "TAOL" is replaced by "TAOR" in the above expression (2), SWR can be calculated.

Figure 10:
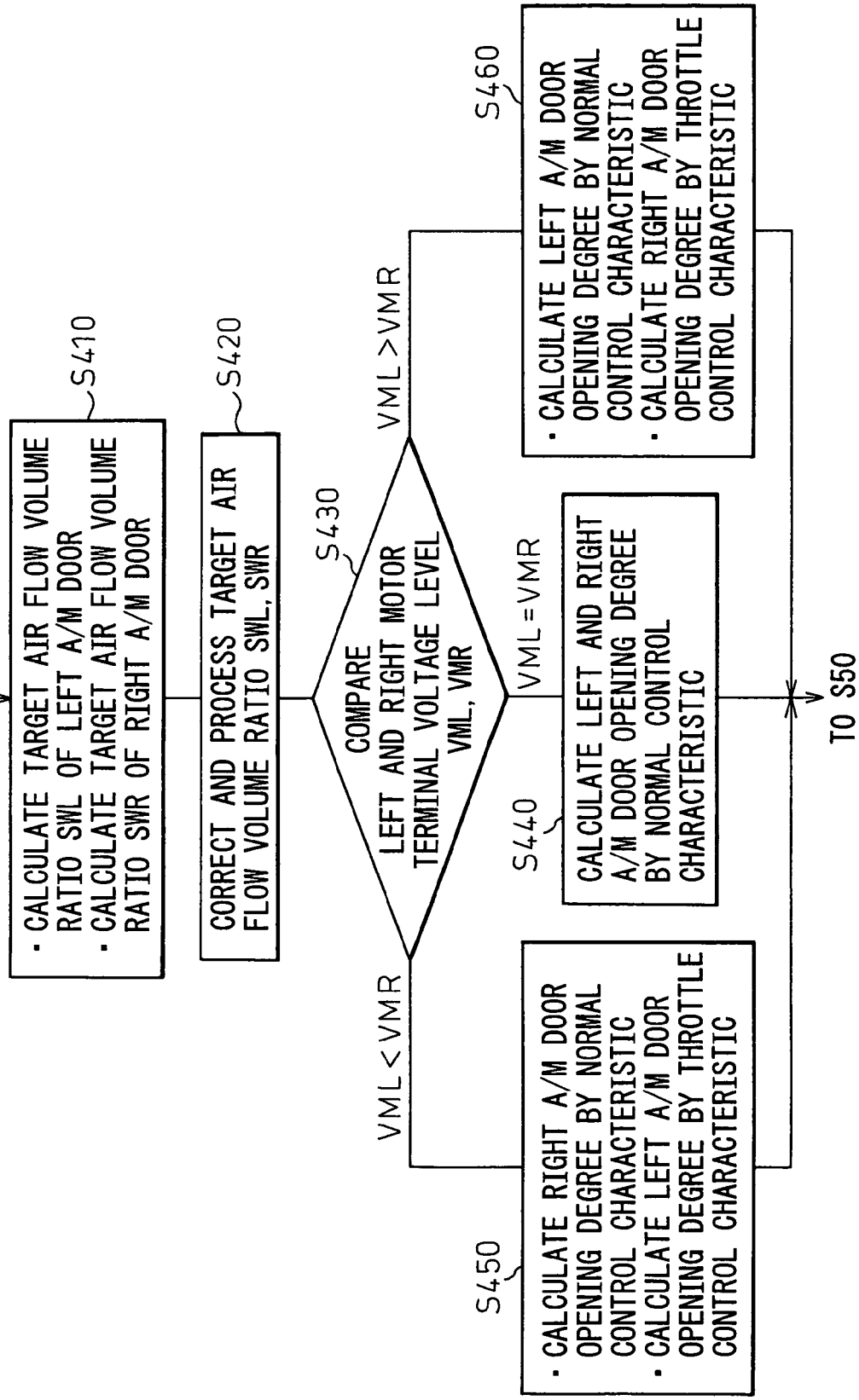
FIG. 10 is a flow chart showing a specific calculation processing of calculating an air mixing door control value in FIG. 7.

Next, in step S420 shown in FIG. 10, the correction processing of the left and the right target air flow volume ratios SWL, SWR is conducted. Specifically, this correction processing is conducted to accomplish two objects. One object is the correction in which the temperature control characteristic of the interior blowout air is matched to the characteristic of the air passage form for each air conditioning unit 2. The other object is the correction in which the temperature control characteristic of the interior blowout air is matched to the blowout mode from the foot opening portions 30, 31 to the lower side in the passenger compartment and the temperature control characteristic of the interior blowout air is also matched to the blowout mode from the face opening portion 40, 41 to the upper side in the passenger compartment.

Next, in step S430 shown in FIG. 10, the left and the right motor terminal voltage levels VML, VMR are compared with each other. In the case of VML=VMR, the program proceeds to step S440, and the left and the right hot air flow air mixing door opening degree and the cold air flow air mixing door opening degree are calculated by the normal control characteristic (shown in FIG. 11) in which the throttle control of the door opening degree is not conducted.

Figure 11:
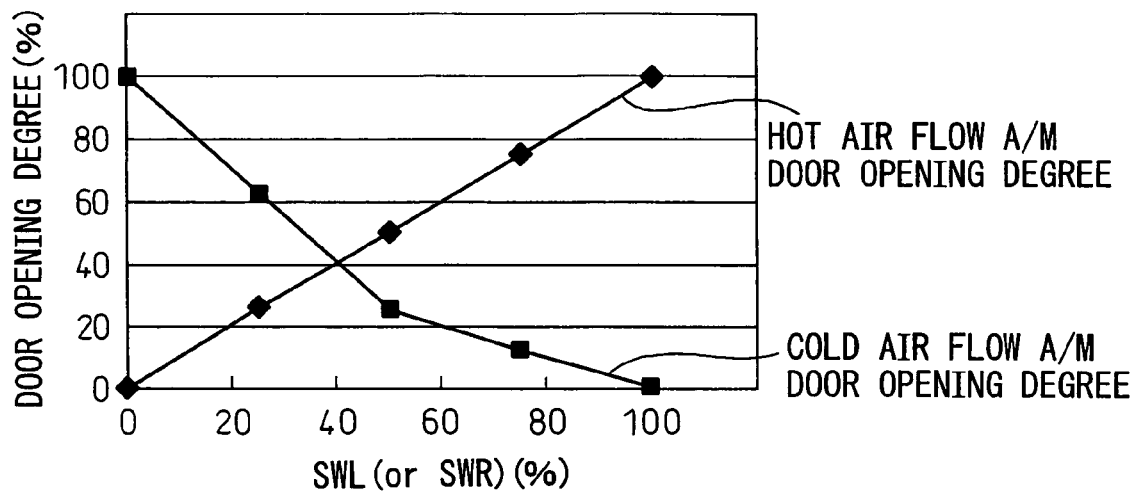
FIG. 11 is a graph showing a normal control characteristic for determining an air mixing door opening degree of an embodiment of the present invention.

In this case, as shown in FIG. 11, the normal control characteristic, in which the throttle control of the door opening degree is not conducted, is defined as the characteristic in which the hot air flow air mixing door opening degree and the cold air flow air mixing door opening degree are respectively controlled between the opening degree 0% and the opening degree 100%.

The axis of abscissas in FIG. 11 represents the calculation value (%) of the left target air flow volume ratio SWL or the right target air flow volume ratio SWR after the correction processing has been completed in step S420, and the axis of ordinates represents the opening degree (%) of each door 24 to 27.

The left hot air flow air mixing door opening degree and the left cold air flow air mixing door opening degree are reciprocally determined according to the calculation value of the left target air flow volume ratio SWL. The right hot air flow air mixing door opening degree and the right cold air flow air mixing door opening degree are reciprocally determined according to the calculation value of the right target air flow volume ratio SWR. In this case, the terminology "reciprocally" is defined as a relation in which when one door opening degree is increased, the other door opening degree is decreased.

According to the opening degree of each door 24 to 27 determined by FIG. 11, the control value inputted into the servo-motor 280 to 310 for driving each door 24 to 27 is determined, and each door 24 to 27 is driven to the opening degree determined by the normal control characteristic shown in FIG. 11.

On the other hand, in the case where it has been judged that VML<VMR in step S430, that is, in the case where the target blowout air flow volume to the right region in the passenger compartment is larger than the target blowout air flow volume to the left region in the passenger compartment, the program proceeds to step S450. Then, the right hot air flow air mixing door opening degree and the right cold air flow air mixing door opening degree are calculated by the normal control characteristic shown in FIG. 11, and the left hot air flow air mixing door opening degree and the left cold air flow air mixing door opening degree are calculated by the throttle control characteristic as described below.

As the volume of the air flow to be sent from the blower is determined according to the larger VMR in step S320, it is possible to ensure a blowout air flow volume to the right region in the passenger compartment by the air flow volume of the blower according to this VMR. On the other hand, concerning the blowout air flow volume to the left region in the passenger compartment, unless an area of the left air passage in the passenger compartment is reduced corresponding to the reduction in which VML is smaller than VMR, the blowout air flow volume to the left region in the passenger compartment will become excessively large. Therefore, the throttle control is conducted on the left hot air flow and the left cold air flow air mixing door opening degrees.

In order to conduct this throttle control, first, the ratio W1 of VML to VMR is calculated by the following expression (3). This ratio W1 is a ratio of the left motor voltage to the right motor voltage. Therefore, it can be said that this ratio W1 is a ratio of the left target air flow volume to the right target air flow volume.

$$W1 = (VML/VMR) \times \alpha \tag{3}$$

In this case, $\alpha$ is a correction coefficient which is a little lower than "1". Specifically, $\alpha=0.9$. This correction coefficient is set for the following reasons. As the left region and the right region in the passenger compartment are not partitioned but communicate to each other, a passenger in each region is affected by the air conditioning state of the adjacent region. In the case of VML<VMR, the passenger in the left region is affected by the conditioned air flow in the right region, the blowout air flow volume of which is large.

Therefore, when the correction coefficient $\alpha$ is set at about 0.9 which is a little lower than "1", the ratio W1 of VML to VMR is corrected to a little lower value, so that the ratio W1 can be fitted to the actual air conditioning feeling of the passenger. Although a previously set fixed value may be used for this correction coefficient, a variable value, which is corrected according to the air conditioning operation condition, may be used when necessary.

Figure 12:
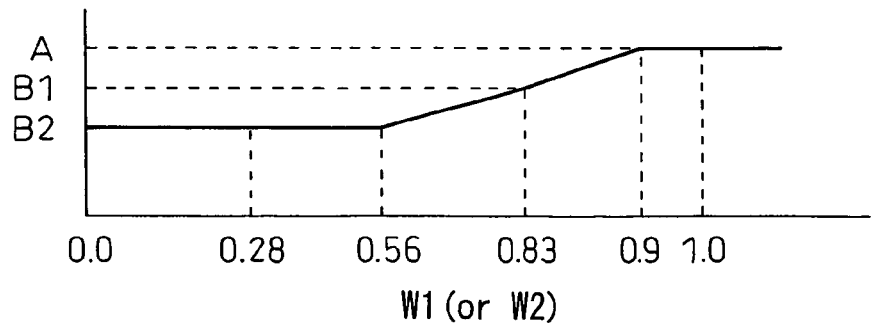
FIG. 12 is a graph showing relations between the blower motor voltage ratios W1, W2 and the control characteristics A, B1, B2 to be selected of an embodiment of the present invention.

Next, according to the ratio W1 of the left motor voltage to the right motor voltage, the throttle control characteristic to be selected is determined by the map shown in FIG. 12. The axis of abscissas of FIG. 12 is the ratio W1 of the left motor voltage to the right motor voltage, and B1 on the axis of ordinates is the first throttle control characteristic and B2 is the second throttle control characteristic. "A" is the normal control characteristic shown in FIG. 11 described above.

Figure 13:
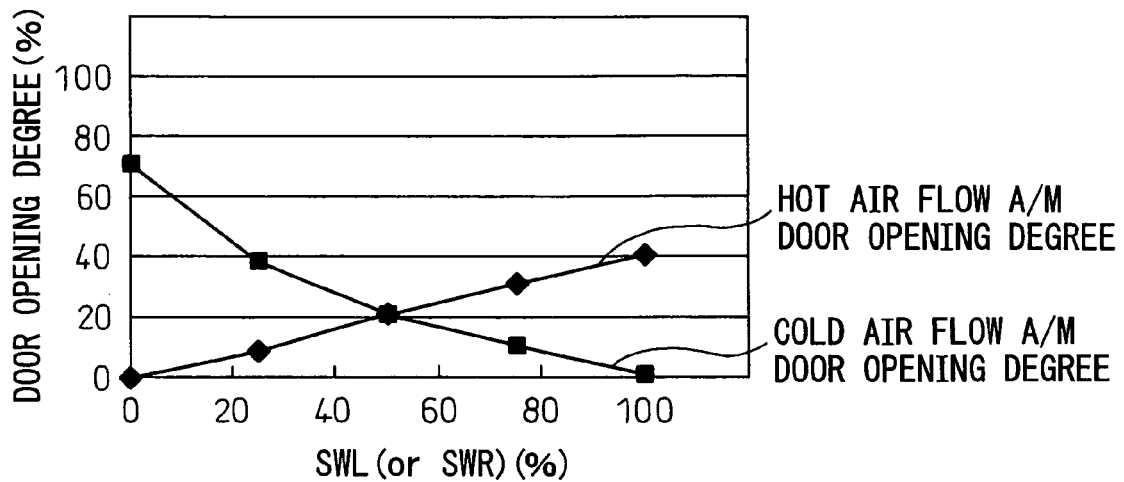
FIG. 13 is a graph showing the first throttling control characteristic for determining an air mixing door opening degree of an embodiment of the present invention.

When the ratio W1 of the left motor voltage to the right motor voltage is 0.83, that is, when W1=0.83, the first throttle control characteristic B1 is selected. A specific example of this first throttle control characteristic B1 is shown in FIG. 13. The axis of abscissas and the axis of ordinates of FIG. 13 are the same as those of FIG. 11 described before. According to this first throttle control characteristic B1, the operation is conducted as follows. At the time of the maximum cooling in which the left target air flow volume ratio SWL or the right target air flow volume ratio SWR is 0%, the cold air flow air mixing door opening degree is throttled to 70%. At the time of the maximum heating in which the left target air flow volume ratio SWL or the right target air flow volume ratio SWR is 100%, the hot air flow air mixing door opening degree is throttled to 40%.

Accordingly, when the ratio W1 of the left motor voltage to the right motor voltage is 0.83, the left cold air flow air mixing door opening degree is determined to a value between 70% and 0% according to the calculation value of the left target air flow volume ratio SWL. The left hot air flow air mixing door opening degree is determined to a value between 0% and 40% according to the calculation value of the left target air flow volume ratio SWL.

Figure 14:
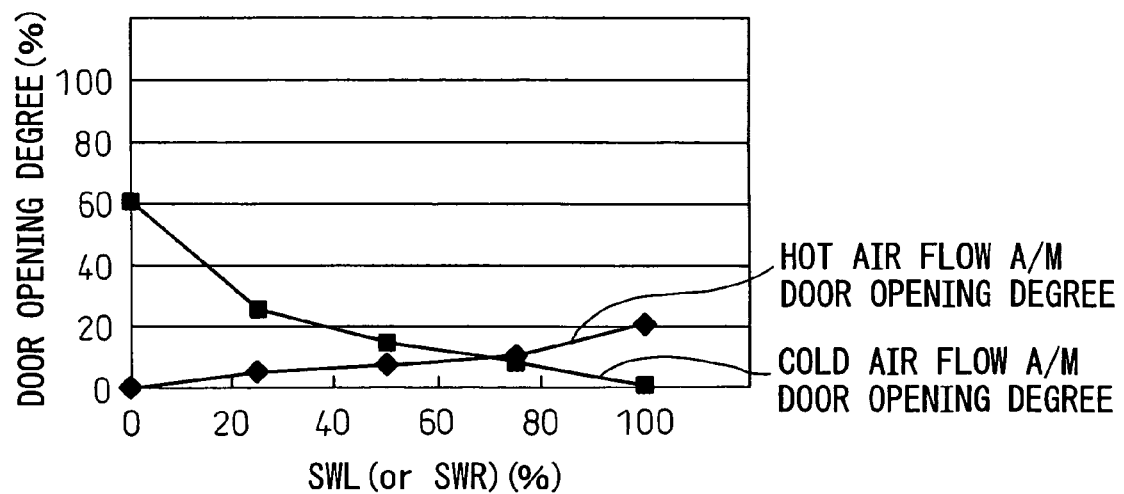
FIG. 14 is a graph showing the second throttling control characteristic for determining an air mixing door opening degree of an embodiment of the present invention.

When the left and right motor voltage ratio W1≦0.56, the second throttle control characteristic B2 is selected by the map shown in FIG. 12. A specific example of this second throttle control characteristic B2 is shown in FIG. 14. The axis of abscissas and the axis of ordinates of FIG. 14 are the same as those of FIGS. 11 and 13 described before.

According to this second throttle control characteristic B2, the operation is conducted as follows. At the time of the maximum cooling in which the left target air flow volume ratio SWL or the right target air flow volume ratio SWR is 0%, the cold air flow air mixing door opening degree is throttled to 60%. At the time of the maximum heating in which the left target air flow volume ratio SWL or the right target air flow volume ratio SWR is 100%, the hot air flow air mixing door opening degree is throttled to 20%. As described above, when the second throttle control characteristic B2 is compared with the first throttle control characteristic B1, the second throttle control characteristic B2 is characterized in that the throttle ratio of the door opening degree (the passage area throttle ratio) is high.

Accordingly, when the left and right motor voltage ratio W1≦0.56, the left cold air flow air mixing door opening degree is determined to a value between 60% and 0% according to the calculation value of the left target air flow volume ratio SWL. The left hot air flow air mixing door opening degree is determined to a value between 0% and 20% according to the calculation value of the left target air flow volume ratio SWL.

In the case where the left and right motor voltage ratio W1 is in the range 0.83<W1<0.9, the left cold air flow air mixing door opening degree and the left hot air flow air mixing door opening degree may be determined by the linear interpolation of the door opening degree, which is determined by the first throttle control characteristic B1, and the door opening degree which is determined by the normal control characteristic A.

In the same manner, in the case where the left and right motor voltage ratio W1 is in the range 0.56<W1<0.83, the left cold air flow air mixing door opening degree and the left hot air flow air mixing door opening degree may be determined by the linear interpolation of the door opening degree which is determined by the first and the second throttle control characteristic B1, B2.

As described above, in the case of VML<VMR, when the left hot air flow and the left cold air flow air mixing door opening degree are controlled by being throttled, the area of the left air passage 18 in the passenger compartment is throttled so that the blowout air flow volume to the left region in the passenger compartment can be prevented from being extremely increased.

Therefore, even when the blower 10 is operated by the air flow volume corresponding to the higher motor terminal voltage VMR, it is possible for the left air flow passage 18 in the passenger compartment to blow out a volume of air, which corresponds to a VML smaller than VMR, into the left region in the passenger compartment.

Next, when it is judged that "VML>VMR" in step S430, the program proceeds to step S460, and the left hot air flow and the cold air flow air mixing door opening degrees are calculated by the normal control characteristic shown in FIG. 11, and the right hot air flow and the cold air flow air mixing door opening degrees are calculated by the throttle control characteristic as described below.

Figure 8:
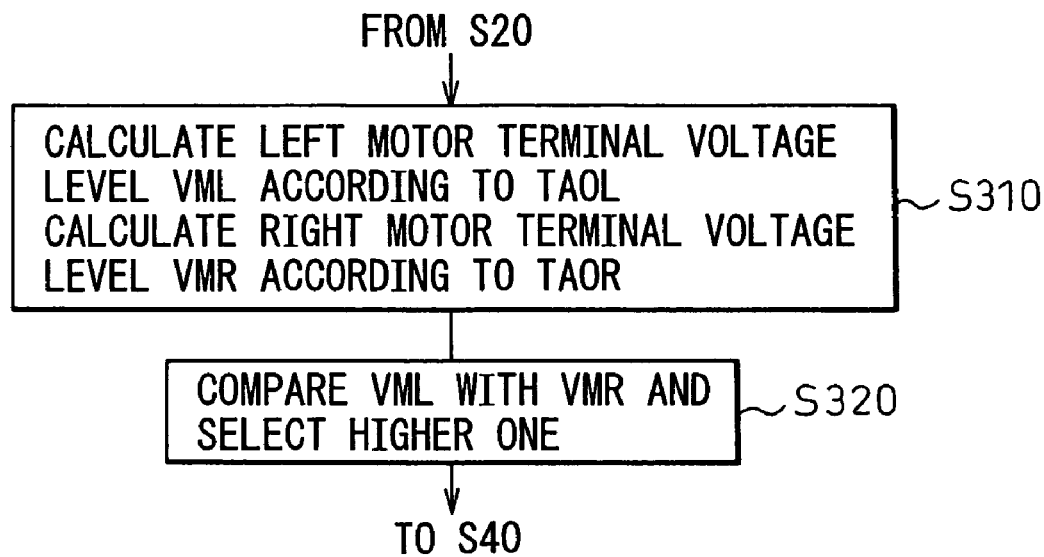
FIG. 8 is a flow chart showing a specific calculation processing of calculating a blower control value in FIG. 7.

At this time, the volume of the air flow sent from the blower is determined according to VML which is the larger one in step S320 in FIG. 8. Therefore, by this volume of the air flow sent from the blower, it is possible to ensure the volume of the blowout air flow to the left region in the passenger compartment. On the other hand, the blowout air flow volume to the right region in the passenger compartment may become too large unless the area of the left air passage in the passenger compartment is reduced by the reduction in which VMR is smaller than VML. Therefore, the throttle control is conducted on the right hot air flow and the right cold air flow air mixing door opening degrees. This throttle control is the same as the throttle control conducted on the left hot air flow and the left cold air flow air mixing door opening degrees in step S450. Therefore, only the different points will be described as follows.

In the case of VML>VMR, the ratio W2 of VMR to VML (the ratio of motor voltage) is calculated by the following expression (4).

$$W2=(VMR/VML)\times\alpha \quad (4)$$

In this expression, the correction coefficient α is the same as that of the above expression (3), and α=about 0.9.

The throttle control characteristic to be selected by the above left and right motor voltage ratio W2 is determined by the map shown in FIG. 12.

According to the motor voltage ratio W2, either the first throttle control characteristic B1 shown in FIG. 13 or the second throttle control characteristic B2 shown in FIG. 14 is selected. In the first throttle control characteristic B1 or the second throttle control characteristic B2, the left hot air flow and the left cold air flow air mixing door opening degrees are determined by the calculation value of the right target air flow volume ratio SWR.

In this connection, when the left and right motor voltage ratio W2 is in the range 0.83<W2<0.9 and when the left and right motor voltage ratio W1 is in the range 0.56<W1<0.83, in the same manner as that described before, the left cold air flow air mixing door opening degree and the left hot air flow air mixing door opening degree may be determined by the linear interpolation of the first throttle control characteristic B1 and the normal control characteristic A or by the linear interpolation of the first and the second throttle control characteristics B1, B2.

As described above, in the case of VML>VMR, when the area of the right air passage 19 in the passenger compartment is throttled by conducting the throttle control of the right hot air flow and the right cold air flow air mixing door opening degrees, it is possible to prevent the volume of the air flow, which is blown out into the right region in the passenger compartment, from being extremely increased.

Therefore, even when the blower 10 is operated by the volume of air to be blown out corresponding to the higher motor terminal voltage VML, it is possible to blow out a volume of conditioned air corresponding to VMR, which is lower than VML, from the right air passage 19 in the passenger compartment into the right region in the passenger compartment.

It should be noted that the present invention is not limited to the above specific embodiment. The present invention can be variously changed as described below.

Figure 15:
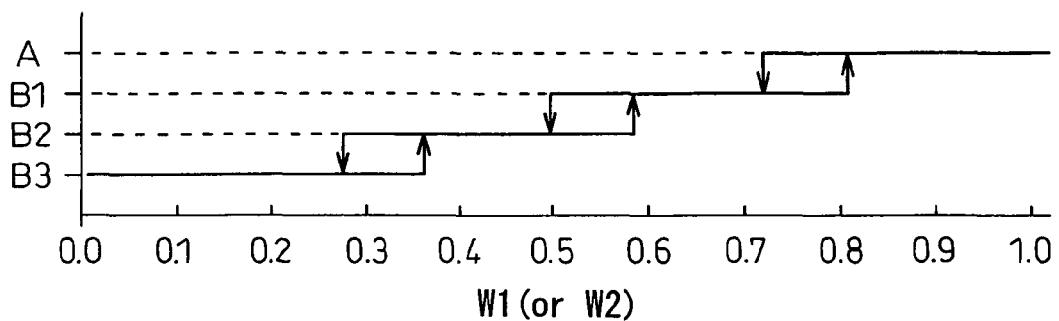
FIG. 15 is a graph showing relations between the blower motor voltage ratios W1, W2 and the control characteristics A, B1, B2, B3 to be selected of another embodiment of the present invention.

(1) In the above embodiment, the cold air flow air mixing door opening degree and the hot air flow air mixing door opening degree are determined when the linear interpolation is conducted between the normal control characteristic A and the first throttle control characteristic B1 and also between the first throttle control characteristic B1 and the second throttle control characteristic B2. However, for example, as shown in FIG. 15, by adding the third throttle control characteristic B3, the throttle of which is larger than that of the second throttle control characteristic B2, one of the control characteristics A to B3 may be always selected according to the value of the motor voltage ratio W1 or W2.

Figure 16:
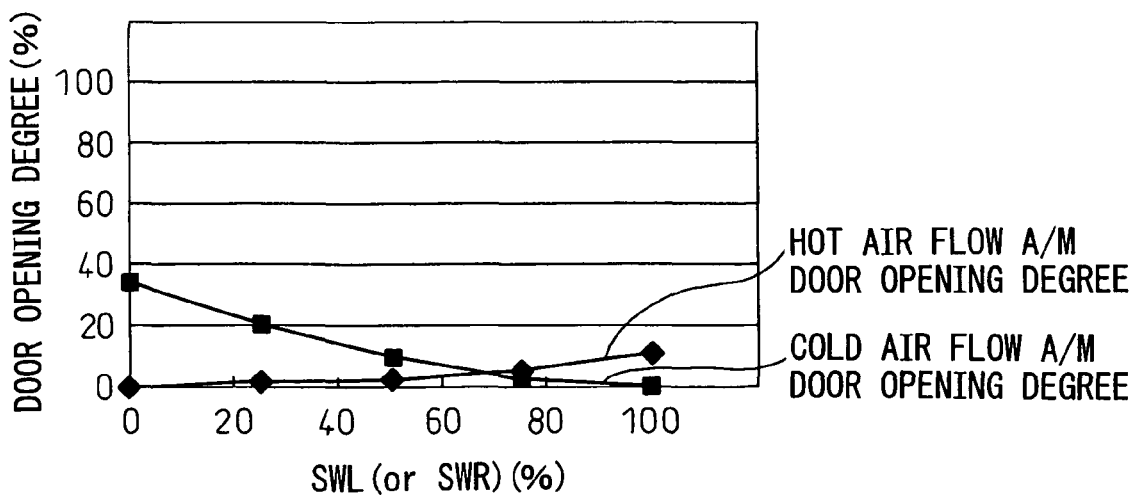
FIG. 16 is a graph showing the third throttling control characteristic for determining an air mixing door opening degree of another embodiment of the present invention.

Due to the foregoing, the door opening degree is always determined according to one of the control characteristics A to B3. Therefore, the door opening degree is not determined by the linear interpolation conducted between the control characteristics. In this connection, a specific example of the third throttle control characteristic B3 is shown in FIG. 16.

(2) In the above embodiment, one of the first and the second throttle control characteristic B1, B2 is selected according to the value of the motor voltage ratio W1 or W2, and according to the thus selected control characteristic, the opening degree of the cold air flow air mixing door and the opening degree of the hot air flow air mixing door are determined. However, the throttle opening degrees of the cold air flow air mixing doors 26, 27 and the hot air flow air mixing doors 24, 25 may be directly calculated according to the motor voltage ratio (the target air flow volume ratio) W1 or W2.

(3) In the above embodiment, explanations are made into a case in which the blowout air volumes to the left region in the passenger compartment and the right region in the passenger compartment are automatically controlled by the left motor terminal voltage level VML, which is calculated by the left target blowout temperature TAOL, and by the right motor terminal voltage level VMR, which is calculated by the right target blowout temperature TAOR. The left air flow volume adjusting switch and the right air flow volume adjusting switch, which are manually operated by the passenger, may be provided on the air conditioning panel 52, and the blowout air volumes to the left region in the passenger compartment and the right region in the passenger compartment may be independently adjusted by these switches according to the preference of the passenger.

This variation can be realized by various means. For example, other than the reference pattern, the air flow volume increasing pattern and the air flow volume decreasing pattern are previously prepared as the map for determining a relation between the target blowout temperature TAOL or TAOR shown in FIG. 9 and the motor terminal voltage VML or VMR, and when the left air flow volume adjusting switch or the right air flow volume adjusting switch is operated to the air flow volume increasing side, the map of the air flow volume increasing pattern is selected, so that the air flow volume to the left region in the passenger compartment or the right region in the passenger compartment can be increased.

On the contrary, when the left air flow volume adjusting switch or the right air flow volume adjusting switch is operated to the air flow volume decreasing side, the map of the air flow volume decreasing pattern is selected, so that the air flow volume to the left region in the passenger compartment or the right region in the passenger compartment can be decreased.

As another means for realizing the above variation, the opening degrees of the hot air flow air mixing doors 24, 25 and the cold air flow air mixing doors 26, 27 may be directly corrected corresponding to the operation conducted by the left air flow volume adjusting switch or the right air flow volume adjusting switch.

(4) In the above embodiment, the opening areas of the hot air flow passages 22, 23 and the cold air flow passages 20, 21 are changed in such a manner that one end portions of the film-shaped members 24a, 25a, 26a, 27a composing the hot air flow air mixing doors 24, 25 and the cold air flow air mixing doors 26, 27 are fixed to the case 14 side and the other end portions of the film-shaped members 24a, 25a, 26a, 27a are wound round the winding shafts 24c, 25c, 26c, 27c and rewound from the winding shafts 24c, 25c, 26c, 27c, so that the opening areas of the hot air flow passages 22, 23 and the cold air flow passages 20, 21 can be changed. However, the structure of the air mixing door, in which the film-shaped member is used, may be changed to a slide door in which a flexible film-shaped member slides on a sealing face on the case side. Concerning this structure, refer to the official gazette of JP-A-2002-79819.

Alternatively, the following structure may be adopted. The hot air flow air mixing doors 24, 25 and the cold air flow air mixing doors 26, 27 are not composed of the flexible film-shaped member but composed of a solid sliding door, and when this solid sliding door is made to slide on a sealing face formed on the case side, the opening areas of the hot air flow passages 22, 23 and the cold air flow passages 20, 21 may be independently changed.

Further, the hot air flow air mixing doors 24, 25 and the cold flow air mixing doors 26, 27 may be composed of a plate door capable of being rotated round a rotary shaft. In this case, when a butterfly door, the rotary shaft of which is arranged in the intermediate portion of the door body, is used as the plate door, a space in which the door is rotated can be reduced.

As described above, concerning the hot air flow air mixing doors 24, 25 and the cold air flow air mixing doors 26, 27, as long as the opening areas of the hot air flow passages 22, 23 and the cold air flow passages 20, 21 can be independently changed, any type of door may be used.

(5) In the above embodiment, explanations are made into a case in which all of the left and the right foot doors 32, 33, the left and the right defroster doors 37, 38 and the left and the right face doors 42, 43' arranged in the left air flow passage 18 and the right air passage 19 are operated being linked with the single blowout mode operation mechanism, so that the left and the right blowout modes can be changed over being linked with each other. However, the left and the right foot doors 32, 33, the left and the right defroster doors 37, 38 and the left and the right face doors 42, 43 may be arranged in the left air passage 18 and the right air passage 19 so that they can be independently operated and the left and the right blowout modes can be independently changed over.

(6) In the above embodiment, explanations are made into a case in which the blowout air flow temperature and the blowout air flow volume into the left region and the right region in the passenger compartment are independently controlled. However, in the same manner, the present invention can be applied to a case in which the blowout air flow temperature and the blowout air flow volume into the front seat region and the rear seat region in the passenger compartment are independently controlled.

(7) In the above embodiment, the left motor terminal voltage level VML and the right motor terminal voltage level VMR are compared with each other in step S320, and the higher one is selected, and the thus selected voltage level is impressed upon the motor 12 for driving the blower as it is. However, the higher selected value may not be impressed upon the motor 12 for driving the blower but a value, which is obtained when the higher selected value is appropriately corrected according to the air conditioning operation condition, may be impressed upon the motor 12 for driving the blower.

An average value of VML and VMR, that is, a value obtained by the calculation of (VML+VMR)/2 may be impressed upon the motor 12 for driving the blower.

The invention claimed is:

1. An air conditioner for vehicle use comprising:
a first air passage for blowing out conditioned air into a first region in a passenger compartment;
a second air passage for blowing out conditioned air into a second region in the passenger compartment;

a single blower for sending a flow of conditioned air into the first and the second air passage;

the first air passage including a first cold air flow passage, in which a cold air flow flows, and a first hot air flow passage, in which a hot air flow flows, the first cold air flow passage and the first hot air flow passage being arranged in parallel with each other, the first air passage further including a first cold air flow door for opening and closing the first cold air flow passage and also including a first hot air flow door for opening and closing the first hot air flow passage, the second air passage including a second cold air flow passage, in which a cold air flow flows, and a second hot air flow passage, in which a hot air flow flows, the second cold air flow passage and the second hot air flow passage being arranged in parallel with each other, the second air passage further including a second cold air flow door for opening and closing the second cold air flow passage and also including a second hot air flow door for opening and closing the second hot air flow passage, wherein means for adjusting a ratio of the volume of the cold air flow in the first cold air flow passage to the volume of the hot air flow in the first hot air flow passage by the first cold air flow door and the first hot air flow door so as to adjust a blowout air flow temperature of the air blowing out from the first air passage into the first region, means for adjusting a ratio of the volume of the cold air flow in the second cold air flow passage to the volume of the hot air flow in the second hot air flow passage by the second cold air flow door and the second hot air flow door so as to adjust a blowout air flow temperature of the air blowing out from the second air passage into the second region, means for independently calculating a first air flow volume control value (VBL) corresponding to a target blowout air flow volume on the first air passage side and a second air flow volume control value (VBR) corresponding to a target blowout air flow volume on the second air passage side, means for determining an air flow volume of the blower according to the first air flow volume control value (VBL) and the second air flow volume control value (VBR), and means for throttling, while the ratio of the volume of the cold air flow to the volume of the hot air flow determined by the cold air flow door and the hot air flow door is maintained constant, an opening area of the passage by the cold air flow door and the hot air flow door in an air passage to which a lower air flow volume control value between the first air flow volume control value and the second air flow volume control value is applied.

2. An air conditioner for vehicle use according to claim 1, wherein an air flow volume of the blower is determined by selecting a higher control value between the first air flow volume control value and the second air flow volume control value.

3. An air conditioner for vehicle use according to claim 1, wherein the opening degrees of the cold air flow door and the hot air flow door for throttling the passage opening area are determined by the lower air flow volume control value.

4. An air conditioner for vehicle use according to claim 1, wherein the first air flow volume control value is determined according to the target blowout air temperature on the first air passage side, the second air flow volume control value is determined according to the target blowout air temperature on the second air passage side, the target air flow volume ration of a cold air flow to a hot air flow on the first air passage side is determined according to the target blowout air temperature on the first air passage side, the target air flow volume ratio of a cold air flow to a hot air flow on the second air passage side is determined according to the target blowout air temperature on the second air passage side, a plurality of throttle control characteristics are previously set which determines a relation between the degrees of openings of the cold and the hot air flow doors for throttling the passage opening area and the target air flow volume ratio in the air passage to which the lower air flow volume control value is applied, one of the plurality of throttle control characteristics is selected according to the ratio of the lower air flow volume control value with respect to the higher air flow volume control value between the first air flow volume control value and the second air flow volume control value, and the degree of opening of the cold air flow door and the degree of opening of the hot air flow door are determined by the target air flow volume ratio according to the thus selected throttle control characteristics.

5. An air conditioner for vehicle use according to claim 1, further comprising:

door operation mechanisms for respectively independently operating the first cold air flow door, the first hot air flow door, the second cold air flow door and the second hot air flow door; and a control means for controlling the door operation mechanisms and the blower.

6. An air conditioner for vehicle use according to claim 1, wherein the first cold air flow door, the first hot air flow door, the second cold air flow door and the second hot air flow door are respectively composed of a film door, the passage opening area of which is changed by the movement of a film-shaped member.

7. An air conditioner for vehicle use according to claim 1, wherein the first region is a left region in the passenger compartment and the first air passage is a left air passage of the vehicle, the second region is a right region in the passenger compartment and the second air passage is a right air passage of the vehicle, means for independently controlling a temperature and an air flow volume of the air blown out from the left air passage of the vehicle by the first cold air flow door and the first hot air flow door, and means for independently controlling a temperature and an air flow volume of the air blown out from the right air passage of the vehicle by the second cold air flow door and the second hot air flow door.

* * * * *